United States Patent
Otsuka et al.

(10) Patent No.: US 9,209,469 B2
(45) Date of Patent: Dec. 8, 2015

(54) SOLID OXIDE FUEL CELL DEVICE

(75) Inventors: Toshiharu Otsuka, Nakama (JP);
Katsuhisa Tsuchiya, Chigasaki (JP);
Tsukasa Shigezumi, Nishinomiya (JP);
Toshiharu Ooe, Chigasaki (JP);
Kiyotaka Nakano, Narashino (JP);
Takuya Matsuo, Yokohama (JP)

(73) Assignee: TOTO LTD., Fukuoka (JP)

( * ) Notice: Subject to any disclaimer, the term of this patent is extended or adjusted under 35 U.S.C. 154(b) by 354 days.

(21) Appl. No.: 13/823,902

(22) PCT Filed: Sep. 28, 2011

(86) PCT No.: PCT/JP2011/072226
§ 371 (c)(1),
(2), (4) Date: Mar. 15, 2013

(87) PCT Pub. No.: WO2012/043648
PCT Pub. Date: Apr. 5, 2012

(65) Prior Publication Data
US 2013/0196239 A1 Aug. 1, 2013

(30) Foreign Application Priority Data

Sep. 30, 2010 (JP) .................. 2010-220711

(51) Int. Cl.
*H01M 8/06* (2006.01)
*H01M 8/04* (2006.01)
(Continued)

(52) U.S. Cl.
CPC ........ *H01M 8/0618* (2013.01); *H01M 8/04022* (2013.01); *H01M 8/0432* (2013.01);
(Continued)

(58) Field of Classification Search
CPC .................. H01M 8/04223; H01M 8/04268; H01M 8/04298–8/04373
See application file for complete search history.

(56) References Cited

U.S. PATENT DOCUMENTS

2004/0048118 A1* 3/2004 Nakaji et al. .................... 429/22
2005/0089732 A1* 4/2005 Aoyama et al. ................. 429/20
(Continued)

FOREIGN PATENT DOCUMENTS

EP 2199255 A1 * 6/2010 ............... C01B 3/38
JP 2003-095611 A 4/2003
(Continued)

OTHER PUBLICATIONS

Machine Translation of Takahashi JP2008-243597 (Oct. 9, 2008).*
(Continued)

*Primary Examiner* — Jonathan Crepeau
*Assistant Examiner* — Jacob Buchanan
(74) *Attorney, Agent, or Firm* — Brinks Gilson & Lione

(57) ABSTRACT

To provide a solid oxide fuel cell device for preventing excess temperature rises inside a fuel cell module during the startup process. During a startup process, a control unit controls the supplied amounts of fuel gas, oxidant gas, and steam supplied to a reformer based on cell stack temperature and reformer temperature and causes transition to a generating process after transitioning to a POX process, an ATR process, and a SR process, and controls to cause a transition to the next process if in each process the cell stack temperature and reformer temperature meet transition conditions set for each; when control unit determines a temperature rise assist state, it controls to cause a transition to the generating process in a state of reduced fuel gas supply amounts compared to when it does not determine a temperature rise assist state.

16 Claims, 13 Drawing Sheets

(51) Int. Cl.
*C01B 3/02* (2006.01)
*H01M 8/24* (2006.01)
*H01M 8/12* (2006.01)

(52) U.S. Cl.
CPC ...... *H01M8/04052* (2013.01); *H01M 8/04223* (2013.01); *H01M 8/04268* (2013.01); *H01M 8/04373* (2013.01); *H01M 8/04776* (2013.01); *H01M 8/0662* (2013.01); *H01M 8/0668* (2013.01); *H01M 8/2475* (2013.01); *C01B 3/02* (2013.01); *H01M 2008/1293* (2013.01); *Y02E 60/50* (2013.01); *Y02E 60/525* (2013.01)

(56) References Cited

U.S. PATENT DOCUMENTS

| | | | | |
|---|---|---|---|---|
| 2005/0123812 | A1* | 6/2005 | Okamoto | 429/24 |
| 2005/0175532 | A1* | 8/2005 | Yamaguchi et al. | 423/652 |
| 2010/0324749 | A1* | 12/2010 | Iwamoto et al. | 700/299 |
| 2011/0053017 | A1* | 3/2011 | Takahashi | C01B 3/382 429/423 |
| 2011/0076578 | A1 | 3/2011 | Shigezumi et al. | |
| 2012/0028143 | A1 | 2/2012 | Akagi et al. | |

FOREIGN PATENT DOCUMENTS

| | | | | |
|---|---|---|---|---|
| JP | 2004-319420 A | | 11/2004 | |
| JP | 2004-338975 A | | 12/2004 | |
| JP | 2005-317405 A | | 11/2005 | |
| JP | 2008-243597 A | | 10/2008 | |
| JP | 2009032555 A | * | 2/2009 | H01M 8/04 |
| JP | WO 2009028427 A1 | * | 3/2009 | C01B 3/382 |
| JP | 2010-238623 A | | 10/2010 | |
| JP | 2011-096635 A | | 5/2011 | |
| WO | WO 2009101736 | * | 8/2009 | H01M 8/04 |

OTHER PUBLICATIONS

Machine Translation of Hirao et al., JP 2003-095611 (Apr. 3, 2003).*
Machine Translation of Ono, JP 2009-032555 (Feb. 2009).*
International Search Report for International Application No. PCT/JP2011/072226, dated Jan. 10, 2012, 2 pages.
Written Opinion of the International Searching Authority for International Application No. PCT/JP2011/072226, dated Jan. 10, 2012, 4 pages.

* cited by examiner

FIG.9

| MODE | PROCESS | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION (°C) | |
|---|---|---|---|---|---|---|---|
| | | | | | | REFORMER TEMPERATURE | CELL STACK TEMPERATURE |
| | COMBUSTION OPERATION | 6.0 | 10.0 | 100.0 | 0.0 | 300°C OR ABOVE | — |
| STARTUP MODE | POX1 | 6.0 | 10.0 | 100.0 | 0.0 | 350°C OR ABOVE | — |
| | POX2 | 5.0 | 18.0 | 100.0 | 0.0 | 600°C OR ABOVE | 250°C OR ABOVE |
| | ATR1 | 5.0 | 8.0 | 100.0 | 2.0 | 600°C OR ABOVE | 400°C OR ABOVE |
| | ATR2 | 4.0 | 4.0 | 100.0 | 3.0 | 650°C OR ABOVE | 600°C OR ABOVE |
| | SR1 | 3.0 | 0.0 | 100.0 | 8.0 | 650°C OR ABOVE | 650°C OR ABOVE |
| | SR2 | 2.3 | 0.0 | 80.0 | 6.3 | 650°C OR ABOVE | 700°C OR ABOVE |

SOLID OXIDE FUEL CELL DEVICE

This application is a 371 application of PCT/JP2011/072226 having an international filing date of Sep. 28, 2011, which claims priority to JP2010-220711 filed Sep. 30, 2010, the entire contents of which are incorporated herein by reference.

TECHNICAL FIELD

The present invention relates to a solid oxide fuel cell device, and more particularly to a solid oxide fuel cell device for preventing excess temperature rises in a reformer or the like during startup.

BACKGROUND ART

Conventionally, solid oxide fuel cell (SOFC) devices were constituted so that during the startup process multiple processes for reforming fuel gas in a reformer, i.e. the partial oxidation reforming reaction process (POX process), auto thermal reforming reaction process (ATR process), and steam reforming reaction process (SR process) were passed through before transitioning to a generating process (see, for example, Patent Citation 1).

In an SOFC, the reformer, fuel cell stack, and the like disposed within a fuel cell module housing chamber can be caused to rise to an operating temperature by executing these processes in sequence.

The operating temperature in an SOFC is a high 600 to 800° C., and heat storage material is disposed around the fuel cell module housing chamber. Therefore this heat storage material can hold a large amount of heat during operation, raising thermal efficiency during operation.

Patent Citation 1: Published Unexamined Application 2004-319420

SUMMARY OF THE INVENTION

Problems the Invention Seeks to Resolve

However, after the operating SOFC transitions to a stop operation, the problem occurs when re-starting that due to the large amount of heat stored in the heat storage material as describe above, the temperature of the reformer or the cell stack rises excessively if startup is carried out by a normal startup process.

In a normal startup operation, for example, within the rated reforming reaction process in the reformer, the heat produced in the POX process, which is an exothermic reaction, causes the temperature of the reformer itself to rise, but also causes a temperature rise in the heat storage material and the like, which is a constituent member outside the reformer.

By contrast, in the restart operation constituent members outside the reformer have already to some extent risen in temperature, and because the heat storage material holds a large amount of heat, the heat produced in the POX process is primarily used to raise the temperature of the reformer. As a result, during the restart operation the reformer temperature rises faster than during normal startup, leading to the risk of causing an excess temperature rise, which is a state in which a predetermined operating temperature is exceeded. There is hence a risk of degradation or damage to the reformer caused by this excess temperature rise.

The present invention was undertaken to resolve this type of issue, and has the object of providing a solid oxide fuel cell device for preventing excess temperature rises inside a fuel cell module during the startup process.

Means for Resolving the Problem

In order to achieve the above objective, the present invention is a solid oxide fuel cell device comprising: a cell stack including multiple fuel cell units in combination; a reformer for reforming fuel gas supplied to the fuel cell units; a combustion portion for heating the reformer and the cell stack using exhaust gas produced by combusting surplus fuel gas or the reformed fuel gas passed through the fuel cell units; and a temperature detector for detecting the temperature of the cell stack and the temperature of the reformer; a module housing chamber for housing the cell stack and the reformer; a heat storage means disposed around the module housing chamber; a determining means for determining whether a temperature rise assist state occurs in which a temperature rise in the reformer and/or cell stack is assisted by the heat amount stored by the heat storage means during startup of the fuel cell device; and a control means for starting up the fuel cell device; wherein the control means is constituted so that in the fuel cell device startup process, supply amounts of fuel gas, oxidant gas, and steam supplied to the reformer are controlled based on the cell stack temperature and the reformer temperature, and after a POX process, an ATR process, and an SR process are performed in sequence by the reformer in a fuel gas reformer reaction process, a transition is made to a generating process, and when the cell stack temperature and reformer temperature satisfy transition conditions set to each of the POX, the ATR and the SR processes, a transition is made to the next process; and wherein when the determining means determines an occurrence of the temperature rise assist state, the control means performs a control to cause a transition to the generating process in a state in which the amount of fuel gas supplied is less than when the determining means does not determine an occurrence of the temperature rise assist state.

If a solid oxide fuel cell device is started up in conditions such that the amount of residual heat in the heat storage means is at or above a predetermined level, it becomes difficult, for example, for heat produced in the partial oxidation reforming reaction inside the reformer to be carried off by the heat storage means. Therefore particularly in the POX and ATR processes, in which partial oxidation reforming reactions are carried out, the speed of the reformer temperature rise increases so that the temperature difference between the reformer temperature and the cell stack temperature is larger compared to that during normal startup.

In such cases, a start up using the same method and transition conditions as in normal startup leads to an excessive reformer temperature rise if waiting for the cell stack temperature to rise, thereby posing the risk, for example, of excess temperature rise in the reformer, to above an anomaly determination temperature, degrading or damaging the reformer. Conversely, there was a risk of degradation of the fuel cell stack when the cell stack temperature rose excessively due to the effects of residual heat.

In the present invention a determination is made by a determining means as to whether a temperature rise assist state is present in which the reformer and/or cell stack temperature is raised by residual heat stored in the heat storage means during startup of the fuel cell device; if a temperature rise assist state is estimated to exist, the amount of heat generated by exhaust gas in the combustion portion is suppressed by reducing the amount of fuel gas supplied at the time of transition to the generating process more than at the time of normal startup, so an excess rise in the reformer temperature, i.e. an excess temperature rise, can be prevented. Since a temperature rise assist state is present, the insufficient portion of the temperature can be made up by residual heat inside the fuel cell module, and the temperature distribution inside the module housing chamber can be maintained appropriately.

In the present invention, when the determining means determines an occurrence of the temperature rise assist state, the control means, based on this determination, preferably reduces the amount of fuel gas supplied during transition to the generating process by an amount depending on the degree of the temperature rise in the reformer and/or cell stack.

In the present invention thus constituted if, in the temperature rise assist state, the residual heat amount is large and the effect of temperature rise is larger, the amount of fuel gas supplied is accordingly reduced more. Thus in the present invention reducing the amount of heat emitted by the combustion portion in accordance with the degree of temperature rise enables the temperature distribution inside the module housing chamber to be appropriately maintained.

In the present invention, the control means preferably adjusts the amount of fuel gas supplied based on changes in the reformer temperature during the SR process.

In the present invention thus constituted, rather than determining a temperature rise assist state based on the residual heat amount and deciding a reduction in fuel gas supply amount at a specific point in time during the startup process, changes in the reformer temperature are continuously monitored over a predetermined period to appropriately adjust the amount of fuel gas supplied according to the temperature rise assist state. Thus in the present invention the amount of fuel gas supplied is feedback-controlled, thereby allowing the amount of fuel gas supplied to be brought to an appropriate value.

In the present invention, for a first predetermined period prior to transition to the generating process during the SR process, the control means preferably holds fixed the amount of fuel gas supplied.

While the fuel gas supply amount is being changed, the temperature distribution inside the module chamber also continues to change, so there is a possibility that areas of high temperature will locally arise. Therefore in the present invention it is possible to transition to the generating process from a steady state in which temperature distribution is stable by keeping the amount of supplied fuel gas fixed for a predetermined period before it is transitioned to the generating process. By so doing, even if a temporary module temperature rise should occur at the time of transition to generation, an accompanying excess temperature rise can be prevented.

In the present invention, the control means preferably holds the amount of fuel gas supplied fixed when the reformer temperature drops to a predetermined first threshold temperature or below and transitions to the generating process after the elapse of the first predetermined period.

In the present invention thus constituted, a transition can be made to the generating process in a state of reduced potential for excess temperature rises caused by the effects of residual heat amounts by confirming that the reformer temperature has come within an appropriate temperature range equal to or less than a first threshold temperature. Moreover, since effects not expressed in a temperature measurement value (such as localized high temperatures and the like inside the module chamber) are reduced by waiting for the elapse of the first predetermined period, excess temperature rises at the time of transition to electrical generation can be prevented.

In the present invention, when the reformer temperature does not fall to the first threshold temperature or below even after the elapse of a second predetermined period in a state of a reduced fuel gas supply amount during the SR process, the control means preferably holds the fuel gas supply amount fixed without waiting for a drop to the first threshold temperature or below, and causes a transition to the generating process after the first predetermined period elapses.

In the present invention thus constituted, when the reformer temperature does not enter an appropriate temperature range at or below the first threshold temperature even after waiting the second predetermined period, the temperature distribution inside the module chamber can be made appropriate by an early transition to the generating process with a low fuel gas supply amount.

In the present invention, when the reformer temperature is at or above a predetermined second threshold temperature higher than the first threshold temperature, the control means preferably shortens the second predetermined period.

When residual heat is large and the extent of the excess temperature rise state is large, then even if the fuel gas supply amount drops in the SR process, there is a risk of entering a state in which the reformer temperature does not fall but actually rises. In the present invention, an early transition to the generating process, in which the fuel gas amount is small, can be achieved, and the temperature distribution inside the module chamber can be made appropriate by shortening the second predetermined period.

In the present invention, the control means preferably does not change the length of the first predetermined period according to the degree of temperature rise in the reformer and/or cell stack, which is based on the determination of a temperature rise assist state.

Whether or not there are localized high temperature spots inside the module housing chamber cannot be directly measured, and is also difficult to estimate. Therefore in the present invention it is possible by fixing the first predetermined period to transition to the generating process after the temperature distribution reaches a stable state, no matter the conditions.

In the present invention, in the SR process, when the reformer temperature exceeds a predetermined third threshold temperature set higher than the first threshold temperature, the amount of fuel gas supplied is preferably held fixed without waiting for the reformer temperature to drop to the first threshold temperature or below, and a transition is made to the generating process after elapse of the first predetermined period.

In conditions such as those in which the reformer temperature approaches a high temperature region close to the anomaly determination temperature, it is difficult in the SR process to return the reformer temperature to an appropriate temperature range at or below the first threshold temperature. Therefore in the present invention, under such circumstances there is an early transition to the generating process, in which the amount of fuel gas supplied is small, thus achieving a drop in reformer temperature.

In the present invention, the control means preferably does not change the length of the first predetermined period according to the degree of temperature rise in the reformer and/or cell stack, which is based on the determination of a temperature rise assist state.

The question of whether there are localized high temperature spots inside the module housing chamber cannot be directly measured, and is also difficult to estimate. Therefore in the present invention it is possible by fixing the first predetermined period to transition to the generating process after the temperature distribution reaches a stable state, no matter the conditions.

Effect of the Invention

In the solid oxide fuel cell device of the present invention, over-rising of the temperature inside the fuel cell module can be prevented in the startup process.

BRIEF DESCRIPTION OF THE DRAWINGS

FIG. 9: An operation table of the startup processing procedure in a fuel cell device according to an embodiment of the present invention.

DETAILED DESCRIPTION OF THE PREFERRED EMBODIMENTS

Next, referring to the attached drawings, a solid oxide fuel cell (SOFC) device according to an embodiment of the present invention will be explained.

Figure 1:
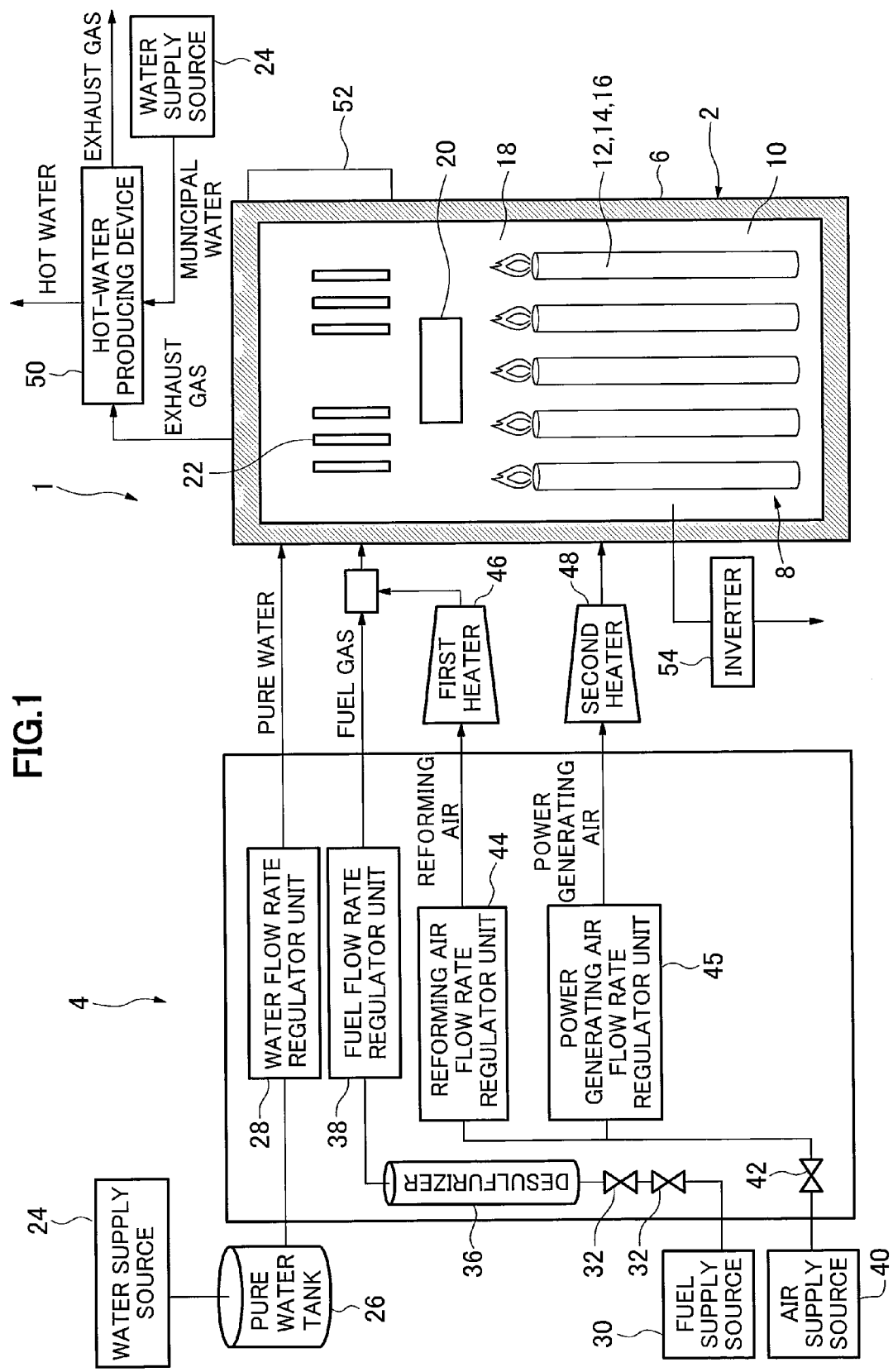
FIG. 1: An overview diagram showing a solid oxide fuel cell device according to an embodiment of the present invention.

FIG. 1 is an overview diagram showing a solid oxide fuel cell (SOFC) device according to an embodiment of the present invention. As shown in FIG. 1, the solid oxide fuel cell (SOFC) device of this embodiment of the present invention is furnished with a fuel cell module 2 and an auxiliary unit 4.

The fuel cell module 2 is furnished with a housing 6 which a heat storage material 7 is disposed around; a sealed space 8 is formed within the housing 6. Note that the heat storage material 7 is capable of storing heat generated in the fuel cell module 2, and is thus capable of improving the heat efficiency of the fuel cell module 2. A fuel cell assembly 12 for carrying out the electrical power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the electrical generation reaction are combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate of water supplied from the reservoir tank. The auxiliary unit 4 is further furnished with a gas shutoff valve 32 for shutting off the fuel gas supplied from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate of fuel gas. Furthermore, the auxiliary unit 4 is furnished with an electromagnetic valve 42 for shutting off air serving as an oxidant and supplied from an air supply source 40, a reforming air flow rate regulator unit 44 and generating air flow rate regulator unit 45 ("air blower" or the like driven by a motor) for regulating air flow rate, a first heater 46 for heating a reforming air supplied to the reformer 20, and a second heater 48 for heating a generating air supplied to the power generating chamber. The first heater 46 and the second heater 48 are provided in order to efficiently raise the temperature at startup, and they may be omitted.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
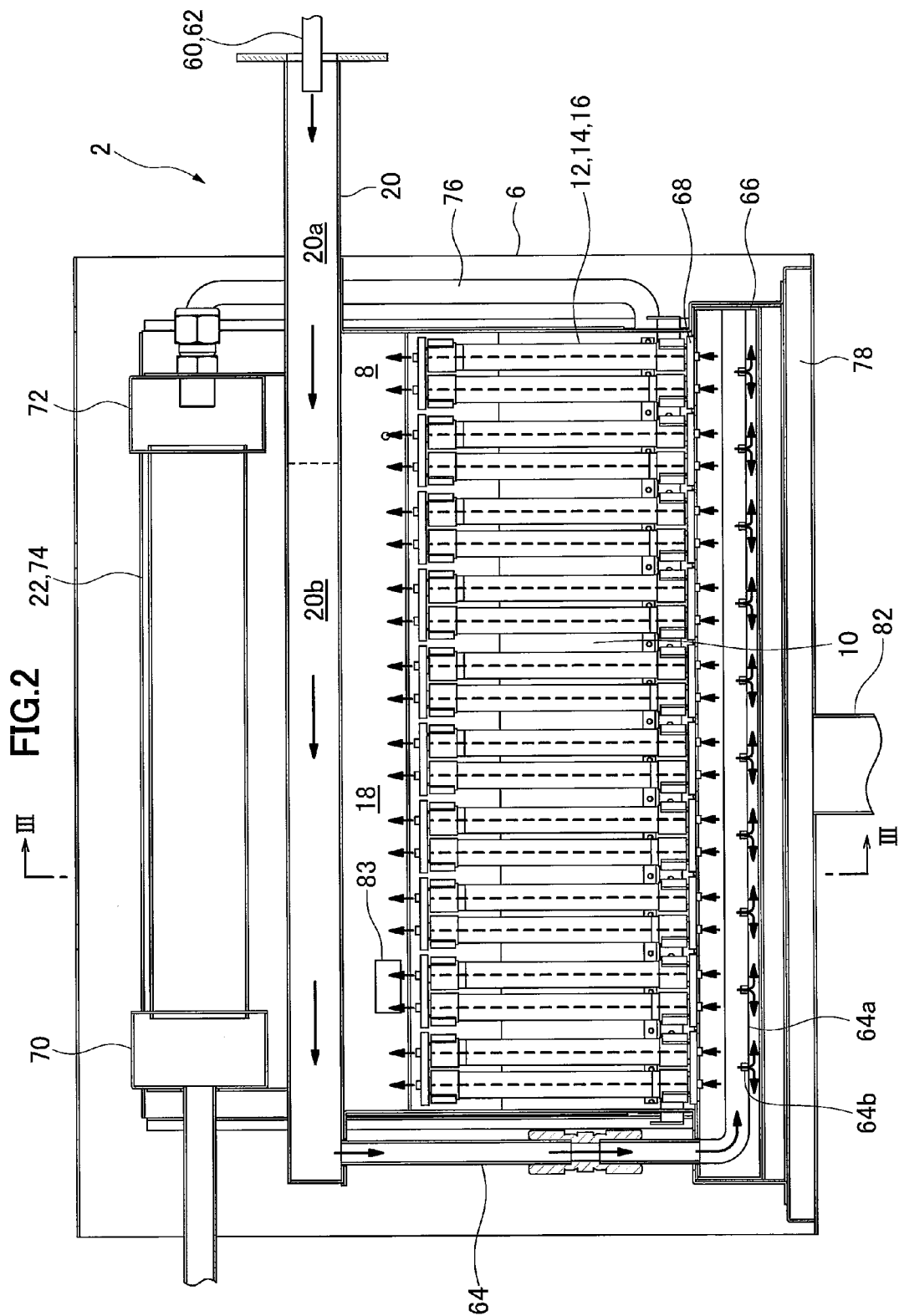
FIG. 2: A front elevation cross section showing a fuel cell module of a fuel cell device according to an embodiment of the present invention.
Figure 3:
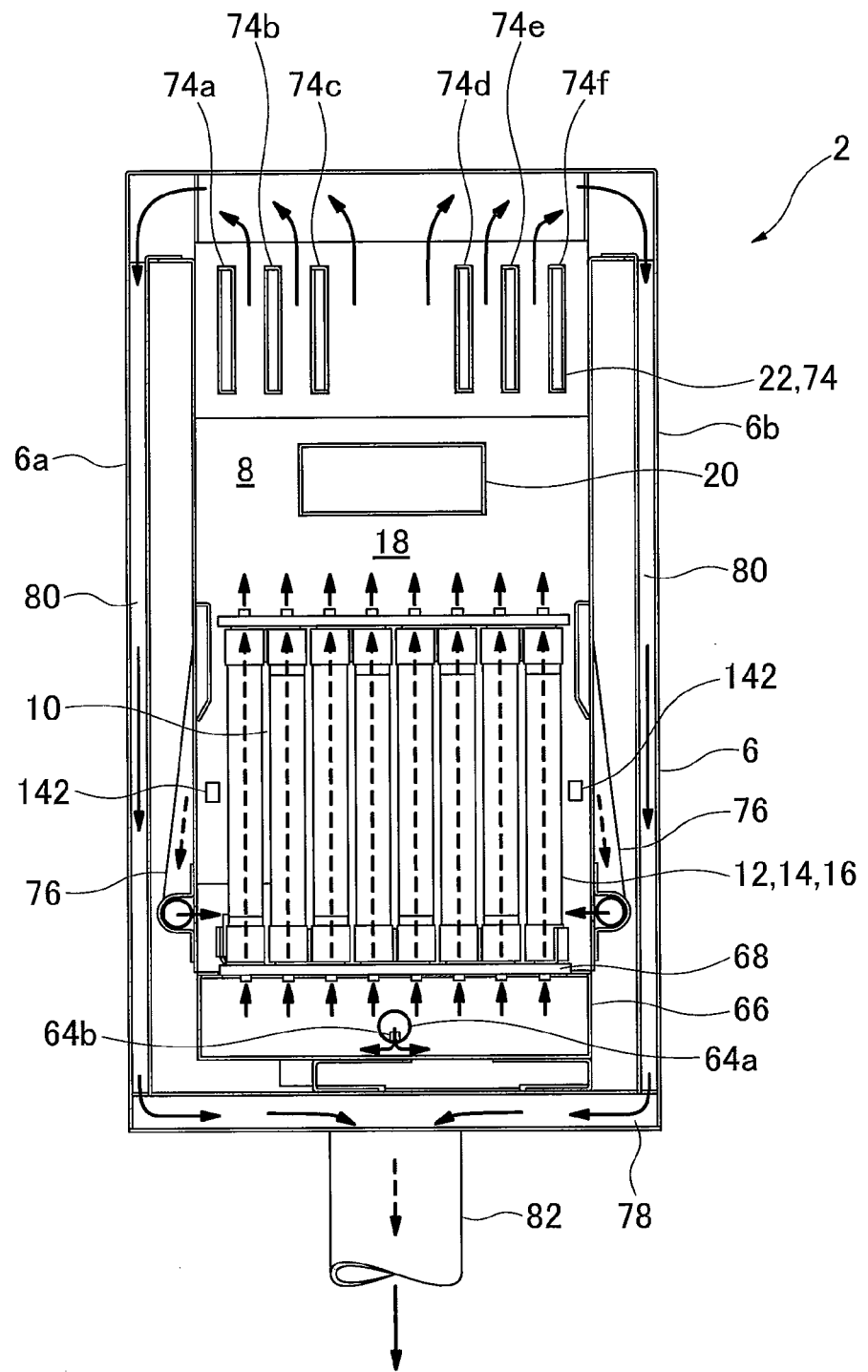
FIG. 3: A sectional diagram along line III-III in FIG. 2.

The internal structure of the solid oxide fuel cell (SOFC) device according to the embodiment of the present invention is explained using FIGS. 2 and 3. FIG. 2 is a side elevation cross section showing the fuel cell module of a solid oxide fuel cell (SOFC) device according to an embodiment of the present invention, and FIG. 3 is a sectional diagram along line III-III in FIG. 2.

As shown in FIGS. 2 and 3, the fuel cell assembly 12, the reformer 20, and the air heat exchanger 22 are arranged in sequence starting from the bottom in the sealed space 8 within the housing 6 of the fuel cell module 2, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold 66 formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell units 16.

Next, the air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top end side of the exhaust gas conduit 80 communicates with the space in which the air heat exchanger 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed in the combustion chamber 18.

Figure 4:
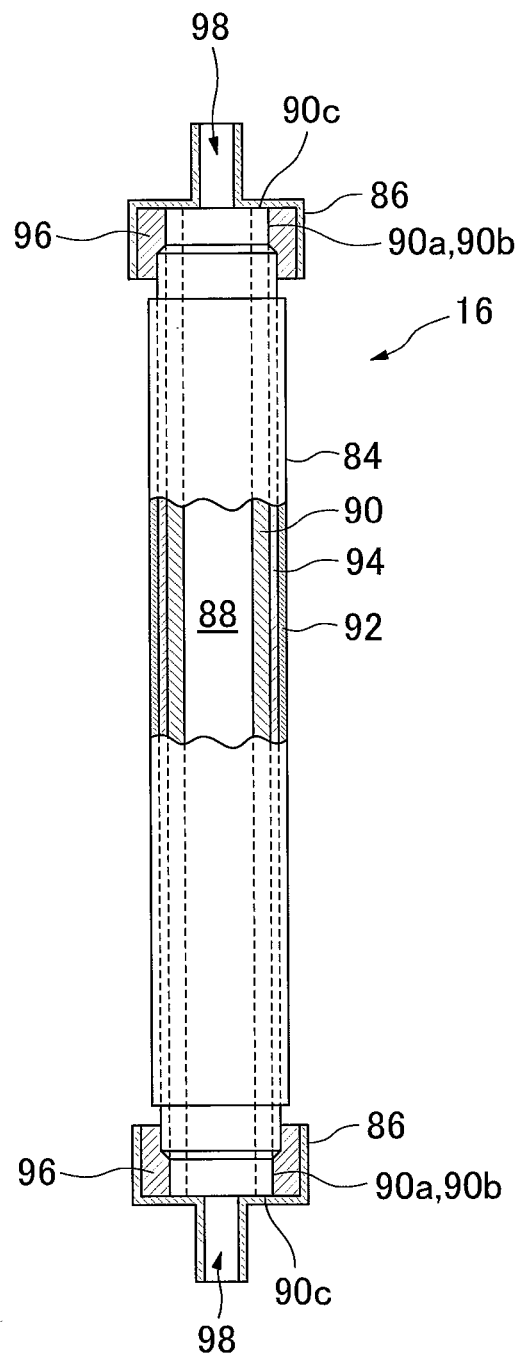
FIG. 4: A partial cross section showing an individual fuel cell unit in a fuel cell device according to an embodiment of the present invention.

Next, referring to FIG. 4, the fuel cell unit 16 will be explained. FIG. 4 is a partial cross section showing an individual fuel cell unit in a solid oxide fuel cell (SOFC) device according to an embodiment of the present invention.

As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with a fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from Ca, Y, Sc, or the like; or a mixture of Ni and ceria doped with at least one type of rare earth element; or any mixture of Ni with lanthanum gallate doped with at least one element selected from Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
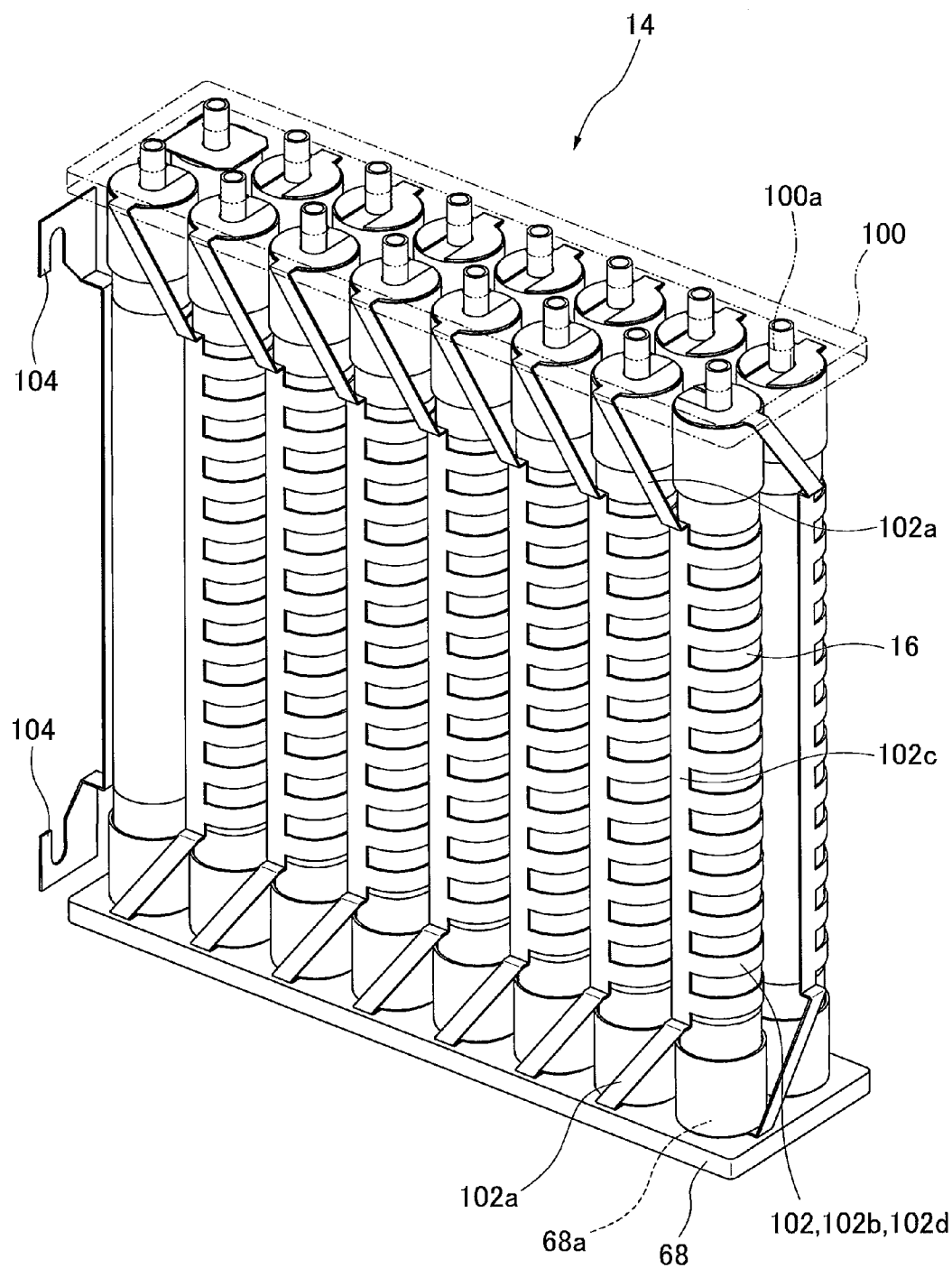
FIG. 5: A perspective view showing a fuel cell stack in a fuel cell device according to an embodiment of the present invention.

Next, referring to FIG. 5, the fuel cell stack 14 will be explained. FIG. 5 is a perspective view showing a fuel cell stack in a solid oxide fuel cell (SOFC) device according to an embodiment of the present invention.

As shown in FIG. 5, the fuel cell stack 14 is furnished with sixteen fuel cell units 16; the top and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Figure 6:
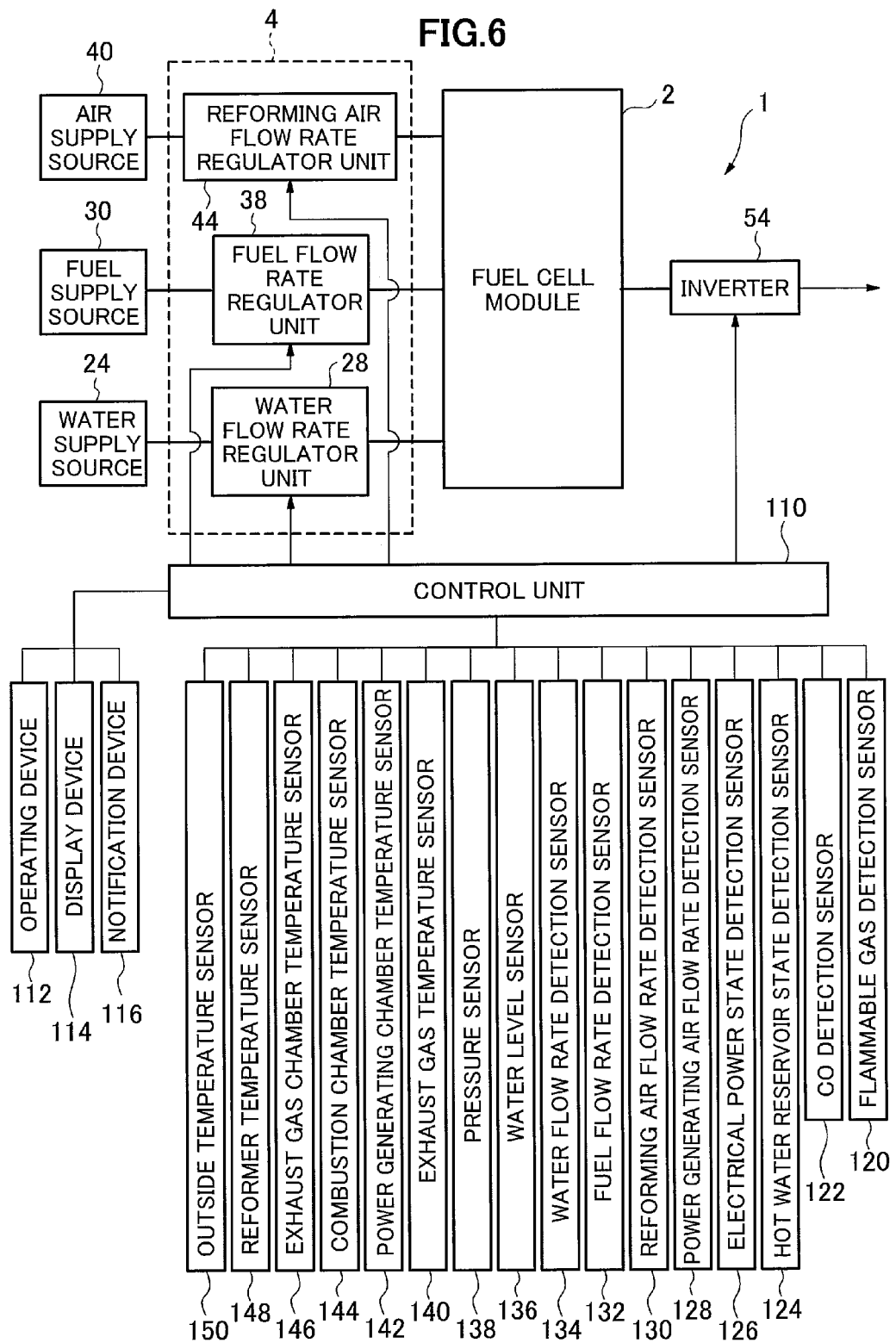
FIG. 6: A block diagram showing a fuel cell device according to an embodiment of the present invention.

Next, referring to FIG. 6, the sensors attached to the solid oxide fuel cell (SOFC) device according to the embodiment of the present invention will be explained. FIG. 6 is a block diagram showing a solid oxide fuel cell (SOFC) device according to an embodiment of the present invention.

As shown in FIG. 6, the solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of a CO detection sensor 122 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the temperature of the reformer 20 from the intake and exit temperatures on the reformer 20.

If the solid oxide fuel cell (SOFC) device is placed outdoors, the outside temperature sensor 150 detects the temperature of the outside atmosphere. Sensors to detect outside atmospheric humidity and the like may also be provided.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Figure 7:
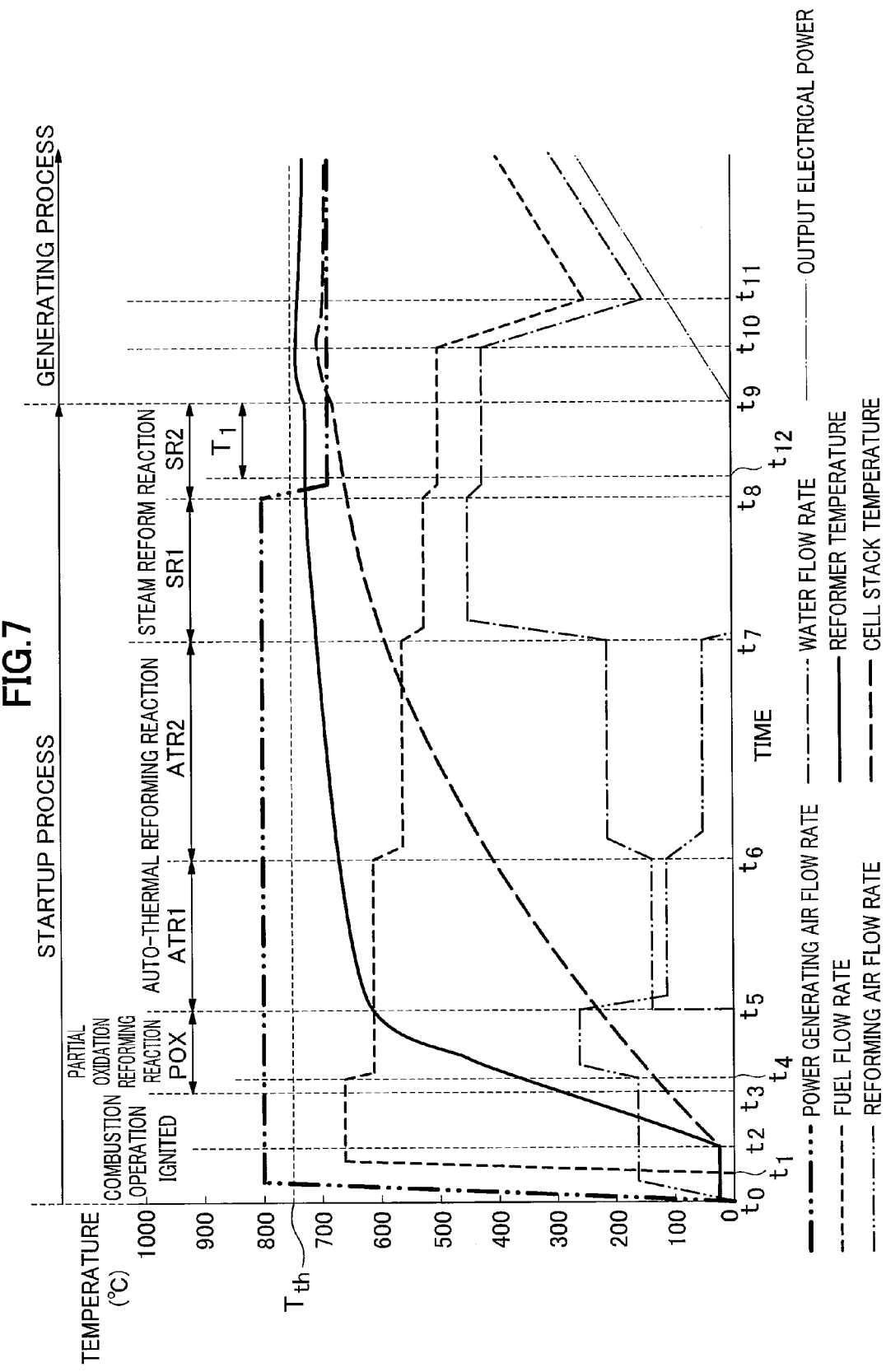
FIG. 7: A timing chart showing the operation at startup of a fuel cell device according to an embodiment of the present invention.

Next, referring to FIG. 7, the operation of a solid oxide fuel cell (SOFC) device according to the present embodiment at the time of startup will be explained. FIG. 7 is a timing chart showing the operations at startup of a sold oxide fuel cell (SOFC) device according to an embodiment of the present invention.

At the beginning, in order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2 via the first heater 46. At the same time, power generating air is supplied from the generating air flow rate regulator unit 45 to the air heat exchanger 22 of the fuel cell module 2 via the second heater 48, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell units 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises in the sealed space 8 of the fuel cell module 2, the fuel gas, which includes the reforming air in the reformer 20 is warmed, as is the power generating air inside the air heat exchanger 22.

At this point, fuel gas into which reforming air is blended is supplied to the reformer 20 by the fuel flow rate regulator unit 38 and the reforming air flow rate regulator unit 44, therefore the partial oxidation reforming reaction POX given by Expression (1) proceeds in the reformer 20. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the combustion chamber 18 is also heated by the combustion of the fuel gas and air, so that the fuel cell stack 14 is also heated from above, thereby enabling an essentially uniform rise in temperature in the vertical direction of the fuel cell stack 14. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \qquad (1)$$

After the start of the partial oxidation reforming reaction POX, based on the temperature of the reformer 20 detected by the reformer temperature sensor 148 and the temperature of the fuel cell stack 14 detected by the generating chamber temperature sensor 142, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, no major drop in temperature will be caused. Also, the combustion reaction continues within the combustion chamber 18 even as the auto-thermal reforming reaction ATR proceeds.

After starting the auto-thermal reforming reaction ATR shown in Expression (2), supply of reforming air by the reforming air flow rate regulator unit 44 is stopped, and supply of steam by the water flow rate regulator unit 28 is increased based on the temperature of the reformer 20 detected by the reformer temperature sensor 148 and the temperature of the fuel cell stack 14 detected by the generating chamber temperature sensor 142. By this means, a gas containing no air and only containing fuel gas and steam is supplied to the reformer 20, where the steam reforming reaction SR of Expression (3) proceeds.

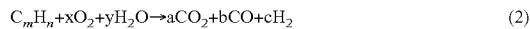

$$C_mH_n + xO_2 + yH_2O \rightarrow aCO_2 + bCO + cH_2 \quad (2)$$

$$C_mH_n + xH_2O \rightarrow aCO_2 + bCO + cH_2 \quad (3)$$

This steam reforming reaction SR is an endothermic reaction, therefore the reaction proceeds as a thermal balance is maintained with the combustion heat from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. After the startup process is completed, electric power is extracted from the fuel cell module 2 to the inverter 54. That is, electrical power generation is started. Generation of electricity by the fuel cell module 2 causes the fuel cell 84 itself to emit heat, such that the temperature of the fuel cell 84 rises.

After the start of the power generation, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Figure 8:
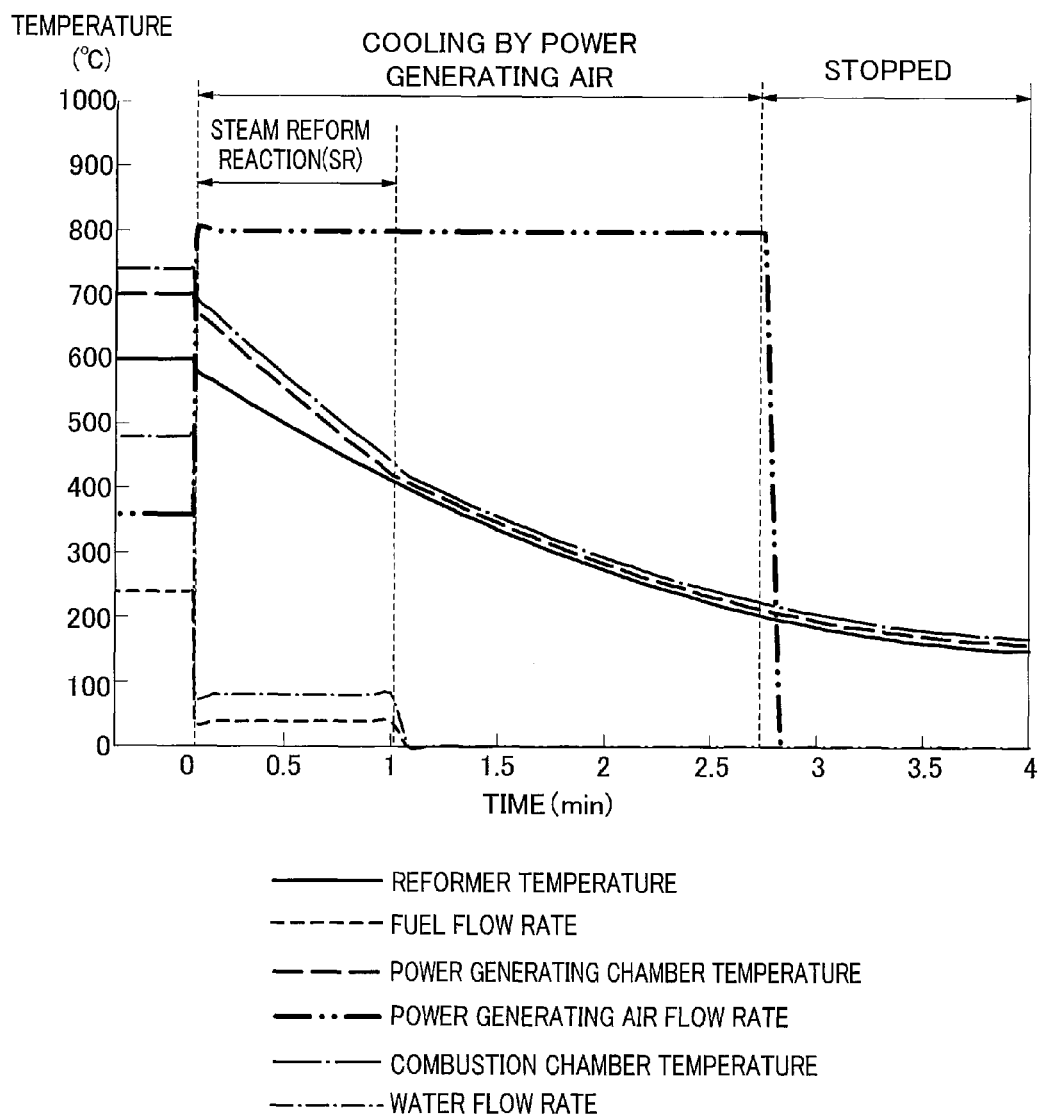
FIG. 8: A timing chart showing the operation when a fuel cell device is stopped according to an embodiment of the present invention.

Next, referring to FIG. 8, the operation upon stopping the solid oxide fuel cell (SOFC) device according to the embodiment of the present invention will be explained. FIG. 8 is a timing chart showing the action when operation of a solid oxide fuel cell (SOFC) device according to an embodiment of the present invention is stopped.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber has dropped to a predetermined temperature, for example to 400° C., the supply of fuel gas and steam to the reformer 20 is stopped, and the steam reforming reaction SR in the reformer 20 ends. Supply of power generating air continues until the temperature in the reformer 20 drops to a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIGS. 7 and 9, we discuss details of the operation of a solid oxide fuel cell (SOFC) according to the present embodiment at the time of startup.

FIG. 9 is an operation table for the basis of the startup processing procedure of the solid oxide fuel cell 1; it is used when there is no risk of the excess temperature rise described below in a state of amount of residual heat remaining in the fuel cell module 2 being at or below a predetermined amount upon startup.

As shown in FIG. 9, in the startup process the control unit 110 executes each of the operating control states (the combustion operation process, POX1 process, POX2 process, ATR1 process, ATR2 process, SR1 process, SR2 process) in temporal sequence and transitions to the generating process.

Note that the POX 1 process and POX2 process are processes in which a partial oxidation reforming reaction is carried out inside the reformer 20. The ATR 1 process and ATR2 process are processes in which auto thermal reforming reaction is carried out inside the reformer 20. The SR1 process and SR2 process are processes in which a steam reforming reaction is carried out inside the reformer 20. Each of the above POX, ATR, and SR processes is respectively subdivided in two, but these may be subdivided into three or more without such limitation, and an unsubdivided constitution is also possible.

First if solid oxide fuel cell 1 is started at time $t_0$, the control unit 110 sends signals to the reforming air flow rate regulator unit 44 and the generating air flow rate regulator unit 45 starting those up and supplying reforming air (oxidant gas) and generating air to the fuel cell module 2. Note that in the present embodiment, at time $t_0$, the reforming air supply amount at which supply starts set to 10.0 (L/min), while the generating air supply amount is set to 100.0 (L/min) (see FIG. 9 "Combustion Operation" process).

Next, at time $t_1$, the control unit 110 sends a signal to the fuel gas flow rate regulator unit 38 and starts the supply of fuel gas to the reformer 20. Fuel gas and reforming air fed into the reformer 20 are thus fed into each of the individual fuel cell units 16 via fuel gas supply pipe 64 and manifold 66. Fuel gas and reforming air fed into each of the individual fuel cell units 16 flow out from the top end of the fuel gas flow paths 98 on each of the individual fuel cell units 16. Note that at time $t_1$, the fuel gas amount at which supply is started is set to 6.0 (L/min) (see FIG. 9 "Combustion Operation" process).

Furthermore, at time $t_2$, the control unit 110 sends a signal to the ignition device 83 and ignites the fuel gas flowing out from individual fuel cell units 16. Fuel gas inside the combustion chamber 18 is thus combusted, and the exhaust gas produced thereby causes the reformer 20 disposed thereabove to be heated, also raising the temperatures of the combustion chamber 18, the generating chamber 10, and the fuel cell stacks 14 disposed inside of same ("cell stack temperature" below) (see times $t_2$ through $t_3$ in FIG. 7). The individual fuel cell units 16 including the gas flow paths 98 and the top end locations thereof correspond to the combustion portion.

When the temperature of the reformer 20 (the "reformer temperature" below) is raised by the heating of the reformer 20 to approximately 300° C., a partial oxidation reforming reaction (POX) occurs inside the reformer 20 (FIG. 7 time $t_3$: POX1 process start). Because the partial oxidation reforming reaction is an exothermic reaction, the reformer 20 is heated by the reaction heat produced by the partial oxidation reforming reaction (FIG. 7, time $t_3$ to $t_5$).

When the temperature further rises and the reformer temperature reaches 350° C. (the POX2 transition condition), the control unit 110 sends a signal to the fuel gas flow rate regulator unit 38 reducing the amount of fuel gas supplied, and sends a signal to the reforming air flow rate regulator unit 44 increasing the amount of reforming air supplied (FIG. 7 time $t_4$: POX2 process start). The amount of fuel gas supplied is thus changed to 5.0 (L/min), and the amount of reforming air supplied is changed to 18.0 (L/min). (See FIG. 9, "POX2" process). These supply amounts are suited to producing a partial oxidation reforming reaction. In other words, in the initial temperature region at which the partial oxidation reforming reaction begins to occur, increasing the proportion of fuel gas supplied forms a state in which fuel gas is reliably ignited, and maintaining that supply amount stabilizes ignition (See FIG. 9, "POX1" process). Moreover, after stable ignition and temperature rise, wastage of gas is suppressed by setting the amount of fuel gas to an amount necessary and sufficient for producing the partial oxidation reforming reaction (see FIG. 9, "POX2" process).

Next, at time $t_5$ in FIG. 7, when the reformer temperature reaches 600° C. or above, and the cell stack temperature reaches 250° C. or above (the ATR1 transition condition), the control unit 110 sends a signal to the reforming air flow rate regulator unit 44 reducing the amount of reforming air supplied, while also sending a signal to the water flow rate regulator unit 28 starting the supply of water (ATR1 process start). The reforming air supply amount is thus changed to 8.0 (L/min), and the amount of water supplied is set to 2.0 (cc/min) (see FIG. 9, "ATR1" process). The introduction of water (steam) into the reformer 20 causes a steam reforming reaction to also be produced inside reformer 20. That is, in the "ATR1" process of FIG. 9 an auto thermal reforming reaction (ATR) occurs in which the partial oxidation reforming reaction and the steam reforming reaction are mixed.

In the present embodiment the cell stack temperature is measured by the generating chamber temperature sensor 142 disposed within the generating chamber 10. The temperature inside the generating chamber and the cell stack temperature are not precisely speaking identical, but the temperature detected by the generating chamber temperature sensor reflects the cell stack temperature, and the cell stack temperature can be grasped using the generating chamber temperature sensor disposed inside the generating chamber. Note that in the present Specification, the cell stack temperature means a temperature measured by any desired sensor indicating a value reflecting the cell stack temperature.

In addition, at time $t_6$ in FIG. 7, when the reformer temperature reaches 600° C. or above, and the cell stack temperature reaches 400° C. or above (the ATR2 transition condition), the control unit 110 sends a signal to the fuel gas flow rate regulator unit 38 reducing the amount of fuel gas supplied. Also, the control unit 110 sends a signal to the reforming air flow rate regulator unit 44 reducing the amount of reforming air supplied, while also sending a signal to the water flow rate regulator unit 28 increasing the amount of water supplied (ATR2 process start). The amount of fuel gas supplied is thus changed to 4.0 (L/min), the amount of reforming air supplied is changed to 4.0 (L/min), and the amount of water supplied is changed to 3.0 (cc/min) (See FIG. 9, "ATR2" process). Inside the reformer 20, the reduction in the reforming air supply amount and increase in the water supply amount cause the proportion of the exothermic partial oxidation reforming reaction in the reformer 20 to decrease, and the proportion of the endothermic steam reforming reaction to increase. A rise in the reformer temperature is thus suppressed, while the raising of the temperature of the fuel cell stack 14 by the flow of gas received from reformer 20 causes the cell stack temperature to rise so as to catch up with the reformer temperature, so that the temperature difference between the two is reduced, and the temperature of both is stably raised.

Next, at time $t_7$ in FIG. 7, the temperature difference between the reformer temperature and the cell stack temperature shrinks, and when the reformer temperature reaches 650° C. or above, and the cell stack temperature reaches 600° C. or above (the SR1 transition condition), the control unit 110 sends a signal to the reforming air flow rate regulator unit 44, stopping the supply of reforming air. Also, the control unit 110 sends a signal to the fuel gas flow rate regulator unit 38 reducing the amount of fuel gas supplied, while also sending a signal to the water flow rate regulator unit 28 increasing the amount of water supplied (SR1 process start). The fuel gas supply amount is thus changed to 3.0 (L/min), and the amount of water supplied is changed to 8.0 (cc/min) (see FIG. 9, "SR1" process). Stopping of the supply of reforming air results in a cessation of the partial oxidation reforming reaction inside the reformer 20, and an SR is started in which only the steam reforming reaction occurs.

Moreover, at time $t_8$ in FIG. 7, the temperature difference between the reformer temperature and the cell stack temperature shrinks further, and when the reformer temperature reaches 650° C. or above, and the cell stack temperature reaches 650° C. or above (the SR2 transition condition), the control unit 110 sends a signal to the fuel gas flow rate regulator unit 38 reducing the fuel gas supply amount, and sends a signal to the water flow rate regulator unit 28 reducing the water supply amount. The control unit 110 then sends a signal to the generating air flow rate regulator unit 45 reducing the generating air supply amount as well (SR2 process start). The fuel gas supply amount is thus changed to 2.3 (L/min), the amount of water supplied is changed to 6.3

(cc/min), and the amount of generating air supplied is changed to 80.0 (L/min) (see FIG. 9, "SR2" process).

In the SR1 process, the reformer temperature and cell stack temperature are raised to close to the temperature at which electrical generation is possible, therefore the fuel gas supply amount and water supply amount are held at a higher level. Thereafter in the SR2 process the fuel gas supply amount and water supply amount are reduced, the reformer temperature and cell stack temperature distribution is caused to stabilize, and the temperature is stabilized to the range at which electrical generation is possible.

From time $t_8$ to time $t_{12}$ in the SR2 process, the control unit 110 reduces each of the supply amounts, including the fuel gas supply amount, at a predetermined reduction rate for use in the SR2 process, maintaining same from time $t_{12}$ for a predetermined generation transition period $T_1$. The reformer 20, fuel cell stack 14, and the like can thus be held in a stable state for a predetermined generating transition period $T_1$ until the electrical generation transition, and the temperature distribution of the reformer temperature, cell stack temperature, and so forth in the fuel cell module 2 can be stabilized. That is, the electrical generation transition period $T_1$ functions as a stabilizing period after reducing the supply amounts.

After the elapse of the electrical generation transition period $T_1$, at time $t_9$ in FIG. 7, when the reformer temperature is 650° C. or above and the cell stack temperature is 700° C. or above (the generating process transition condition), power is caused to be output from the fuel cell module 2 to the inverter 54, and a transition to the generating process is effected and electrical generation commenced (FIG. 7 time $t_9$: generating process start). In the generating process, the fuel gas supply amount and water supply amount are maintained at a fixed level between times $t_9$ and $t_{10}$.

Note that during a normal startup when there is no risk of excess temperature rise, in the SR process when the temperature is highest within the startup process, the reformer temperature is held within an appropriate temperature range at or below a predetermined threshold temperature $T_{th}$ (in this example, 750° C.). Note that threshold temperature $T_{th}$ is set to be a lower temperature than the anomaly determination temperature (in this example, 800° C.) at which the solid oxide fuel cell 1 is forced to an abnormal stop due to the risk of degradation or damage.

Thereafter, in order to cause following of output electrical power, the control unit 110 sends signals to the fuel gas flow rate regulator unit 38 and the water flow rate regulator unit 28 changing the fuel supply amount and water supply amount. Therefore from time $t_{10}$ until time $t_{11}$ the fuel gas supply amount and water supply amount diminish, and subsequent to time $t_{11}$, the fuel gas supply amount and water supply amount are adjusted according to output power demand, and a load-following operation is executed.

Figure 10:
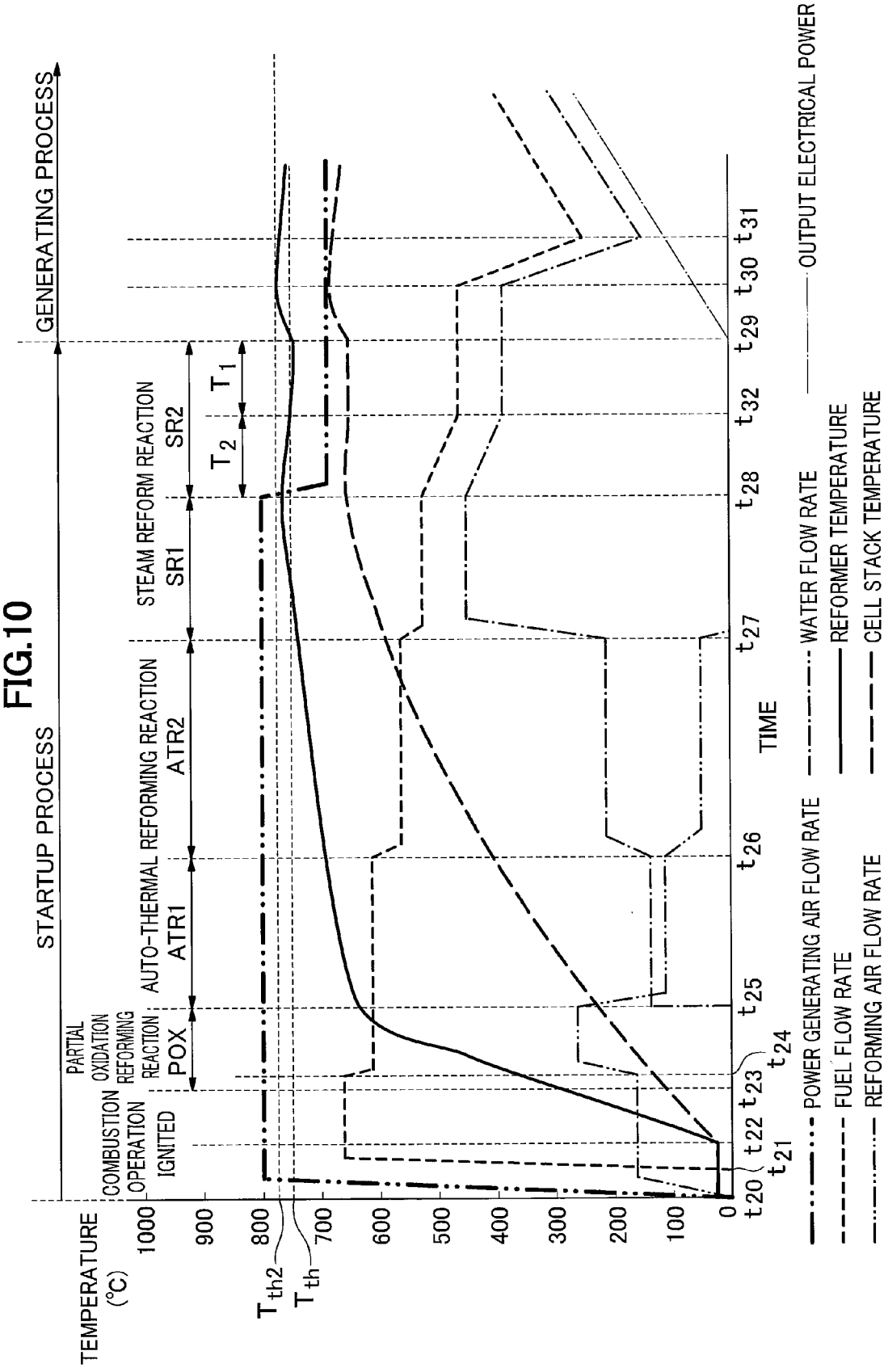
FIG. 10: An explanatory diagram of an excess temperature rise suppression control at time of startup of a fuel cell device according to an embodiment of the present invention.

Next, referring to FIG. 10, we discuss excess temperature rise suppression control in an solid oxide fuel cell device (SOFC) according to the present embodiment.

As described above, the fuel cell module 2 is constituted such that the heat storage material 7 as a heat storage means is provided around the housing 6 serving as module housing chamber in order to improve thermal efficiency, and internally produced heat can be effectively used without being released to the outside.

However, when the fuel cell device 1 is being operated and then a stop operation is entered in a state whereby the entirety of the fuel cell module 2 including the heat storage material 7 is in an elevated temperature state, and then subsequently the system enters a restart process in a state whereby a large amount of heat is accumulated in the heat storage material 7 and the like, the temperature of constituent parts (especially reformer 20) in the fuel cell module 2 rises more easily compared to a normal startup after being at room temperature. For example, in a partial oxidation reforming reaction, which is a exothermic reaction, heat produced by the reformer 20 during normal startup from room temperature heats not only the reformer 20 itself but is also released outside the reformer 20 to raise the temperature of other constituent parts, the heat storage material 7, and the like. However, in a situation in which the heat storage material 7 is holding a large amount of heat, the heat produced in the partial oxidation reforming reaction is primarily used to raise the temperature of the reformer 20, and the speed of the temperature rise in reformer 20 is increased. This leads, for example, to the risk of degradation to the reformer 20 due to an excess temperature rise.

Therefore in the present embodiment, the status as to whether there is a risk of this type of excess temperature rise occurring (i.e., a temperature rise assist state) is sensed, and in response to this state, excess temperature rise suppression control is executed and appropriate restart is implemented in which excess temperature rise is prevented. When a temperature rise assist state is sensed, the excess temperature rise suppression control is a fuel gas reduction control for transitioning to the generating process in a state such that the fuel gas supply amount and water supply amount at the time of the generating process transition are reduced more than the supply amounts during a normal startup when the temperature rise assist state is not sensed and there is no risk of excess temperature rise.

Compared to FIG. 7, FIG. 10 shows the case of a higher rate of increase in reformer temperature. Below we explain primarily the points of difference relative to normal startup operation and processing described in FIGS. 7 through 9.

The startup state from time $t_{20}$ to time $t_{28}$ is essentially the same as the startup state from time $t_0$ to time $t_8$ in FIG. 7, therefore an explanation thereof is omitted.

Compared to normal, the temperature rise of the reformer 20 is faster than the temperature rise of the fuel cell stack 14, therefore the temperature of the reformer 20 exceeds the transition temperature condition of 650° C. for transitioning from the ATR2 process to the SR1 process prior to time $t_{27}$. At time $t_{27}$, when the cell stack temperature reaches the transition temperature condition of 600° C., both transition conditions are satisfied, so that the control unit 110 causes a transition from the ATR2 process to the SR1 process.

The condition for transitioning from the SR1 process to the SR2 process is that the reformer temperature be 650° C. or above, and the cell stack temperature be 650° C. or above (SR2 transition condition). Even after the SR1 process transition, the reformer temperature continues to rise, and at time $t_{28}$, when the cell stack temperature reaches 650° C., which is the temperature condition for transitioning to the SR2 process, the reformer temperature exceeds 650° C., which is the transition temperature condition for transitioning to the SR2 process, and rises to threshold temperature $T_{th}$ or greater. However in this case the reformer temperature does not reach second threshold temperature $T_{th2}$ (in this example 780° C.), which is set between threshold temperature $T_{th}$ and the anomaly determination temperature.

At the end of the SR1 process (or the beginning of the SR2 process), if the reformer temperature has passed the threshold temperature $T_{th}$ (in this example 750° C.), then the reformer temperature has gone outside the temperature rise process of the transition temperature shown in the operating table of FIG. 9 serving as references of the reformer temperature and the cell stack temperature, and the rate of rise in the reformer temperature has sped up, therefore the control unit 110, acting as determination means, determines a state in which the temperature rise of the reformer 20 is assisted due to a large amount of heat stored in fuel cell module 2, or a state in which the rate of temperature rise is faster than at normal startup, i.e. a temperature rise assist state.

In other words, in the present embodiment a determination of a temperature rise assist state is made when the rate of reformer temperature rise is fast compared to the rate of cell stack temperature rise, the temperature difference between the two is greater than normal, and the reformer temperature reaches a threshold temperature $T_{th}$ greater by a predetermined temperature or more than the transition temperature when the cell stack temperature reaches the transition temperature.

In addition, at the end of the SR1 process, the control unit 110 acting as determining means calculates the temperature rise portion in the reformer temperature relative to the threshold temperature $T_{th}$ and estimates the degree of the temperature rise assist state using this temperature rise portion. In other words, a determination is made that the more the reformer temperature exceeds the threshold temperature $T_{th}$, the higher will be the degree to which the reformer 20 and the fuel cell stack 14 are raised in temperature by the residual heat amount (i.e., the degree of excess temperature rise).

In the SR2 process, the control unit 110 thus reduces the fuel gas supply amount and water supply amount at a predetermined reduction speed (temperature reduction period $T_2$). Thus in the temperature reduction period $T_2$, the rise in reformer temperature is suppressed and the reformer temperature gradually decreases due to the reductions in the fuel gas supply amount and water supply amount.

Regarding the point that the endothermic steam reforming reaction is suppressed when the fuel gas supply amount and water supply amount are reduced, this is disadvantageous as a reformer temperature rise suppression effect. However the reduction in fuel gas supply amount results in a reduction as well of the amount of post-reform outflow of fuel gas flowing out from individual fuel cell units 16, reducing the amount of exhaust gas from the combustion portion heating the reformer 20, therefore as a whole the rise in reformer temperature is suppressed.

At the same time, the cell stack temperature rises to gradually catch up with the reformer temperature by receiving a gas flow from the reformer 20 in the SR2 process, reaching a temperature at which electrical generation is possible. Note that in the SR2 process the fuel gas supply amount is reduced more than normally, but in the temperature rise assist state the reduced portion of the fuel gas supply amount is made up by the residual heat amount, therefore the cell stack temperature can be reliably raised up to the temperature at which electrical generation is possible.

The control unit 110 monitors the reformer temperature and performs a feedback control so that the fuel gas supply amount and water supply amount are adjusted based on changes in the reformer temperature, and more specifically to reduce the fuel gas supply amount and water supply amount at a fixed rate of decrease so that the reformer temperature reaches threshold temperature $T_{th}$ or below. By reducing the fuel gas supply amount, the reformer temperature is reduced at time $t_{32}$ to the threshold temperature $T_{th}$ without reaching the second threshold temperature $T_{th2}$ or third threshold temperature $T_{th3}$ in FIG. 10. When the reformer temperature reaches the threshold temperature $T_{th}$ at time $t_{32}$, the control unit 110 stops the reduction in the fuel gas supply amount and water supply amount and ends the temperature reduction period $T_2$, holding the supply amount as of this time.

The control unit 110 then waits until the generation transition period $T_1$ has elapsed from the point at which supply amounts were held fixed (time $t_{32}$) and the temperature distribution has stabilized, then causes a transition from the SR2 process to the generating process on the condition that the reformer temperature and cell stack temperature satisfy the respective transition temperature conditions (generating process transition conditions) of 650° C. or above for the reformer temperature and 700° C. or above for the cell stack temperature at the point (time $t_{29}$) when the generation transition period $T_1$ has elapsed.

Note that in the present embodiment the fuel gas supply amount and water supply amount are reduced until the temperature reduction period $T_2$ ends so that the reformer temperature is reduced down to the threshold temperature $T_{th}$, therefore these supply amounts reach a value which is reduced more than each of the supply amounts in the SR2 process shown in the operating table of FIG. 9, and a transition to the generating process occurs in with the fuel gas supply amount and water supply amount reduced more than during normal startup.

In the present embodiment the period over which the fuel gas supply amount and water supply amount are reduced (times $t_{28}$ to $t_{32}$) lengthens as the size of the temperature difference between the reformer temperature and the threshold temperature $T_{th}$ increases at the end of the SR1 process, thereby increasing the amount of reduction. Therefore the fuel gas supply amount and water supply amount in transitioning to the generating process are set to a value reduced to below the normal supply amounts in proportion to the size of the temperature difference between the reformer temperature and the threshold temperature $T_{th}$ at the time the SR1 process ends.

When there is a transition to the generating process, the cell stack temperature temporarily increases due to the generating reaction in fuel cell stack 14. Accompanying this, the reformer temperature also rises.

At the time of transition to the generating process, however, the fuel gas supply amount is reduced by more than at normal startup, therefore the amount of surplus reformed fuel gas combusted in the combustion portion is also reduced, causing a reduction in the amount of exhaust gas as well, thereby suppressing a temperature rise in the reformer 20. Therefore in FIG. 10 the reformer temperature exceeds the threshold temperature $T_{th}$ immediately after transition to the generation process, but thereafter the fuel gas supply amount and water supply amount is further reduced (time $t_{30}$ forward); a rise in the reformer temperature is suppressed and an appropriate temperature range is maintained without exceeding the anomaly determination temperature.

Thus in the excess temperature rise suppression control of the present embodiment, the rate of rise in the reformer temperature is faster than the rate of rise in the cell stack temperature compared to normal startup, but when the effects of temperature rises caused by residual heat amounts are not very large, reducing the fuel gas supply amount at the time of the generation process transition more than the fuel gas amount during normal startup in the SR2 process enables the prevention of excess temperature rises above a predetermined value (the anomaly determination temperature) at which the reformer temperature or cell stack temperature cause degradation or damage during transition to the generating process, particularly at the time of transition to the generating process and during a predetermined period after the transition to the generating process.

Note that in the present embodiment when a determination is made of a temperature rise assist state, the fuel gas supply amount and water supply amount are reduced at a fixed rate of reduction from the end of the SR1 process, but the invention may also be constituted to reduce in a single or multiple steps down to a predetermined supply amount, without limitation to the above.

In response to the rise in reformer temperature relative to the threshold temperature $T_{th}$ at the end of the SR1 process, in proportion to the size of the temperature rise, the control unit 110 sets amount of reduction in the fuel gas supply amount and water supply amount to be large, and/or sets the temperature reduction period $T_2$ to be long.

In the present embodiment a temperature rise assist state is determined during the SR process and the fuel gas supply amount is reduced in the SR2 process, but without such limitation, the invention can also be constituted to similarly determine a temperature rise assist state and reduce the fuel gas supply amount in the POX process or the ATR process.

Figure 11:
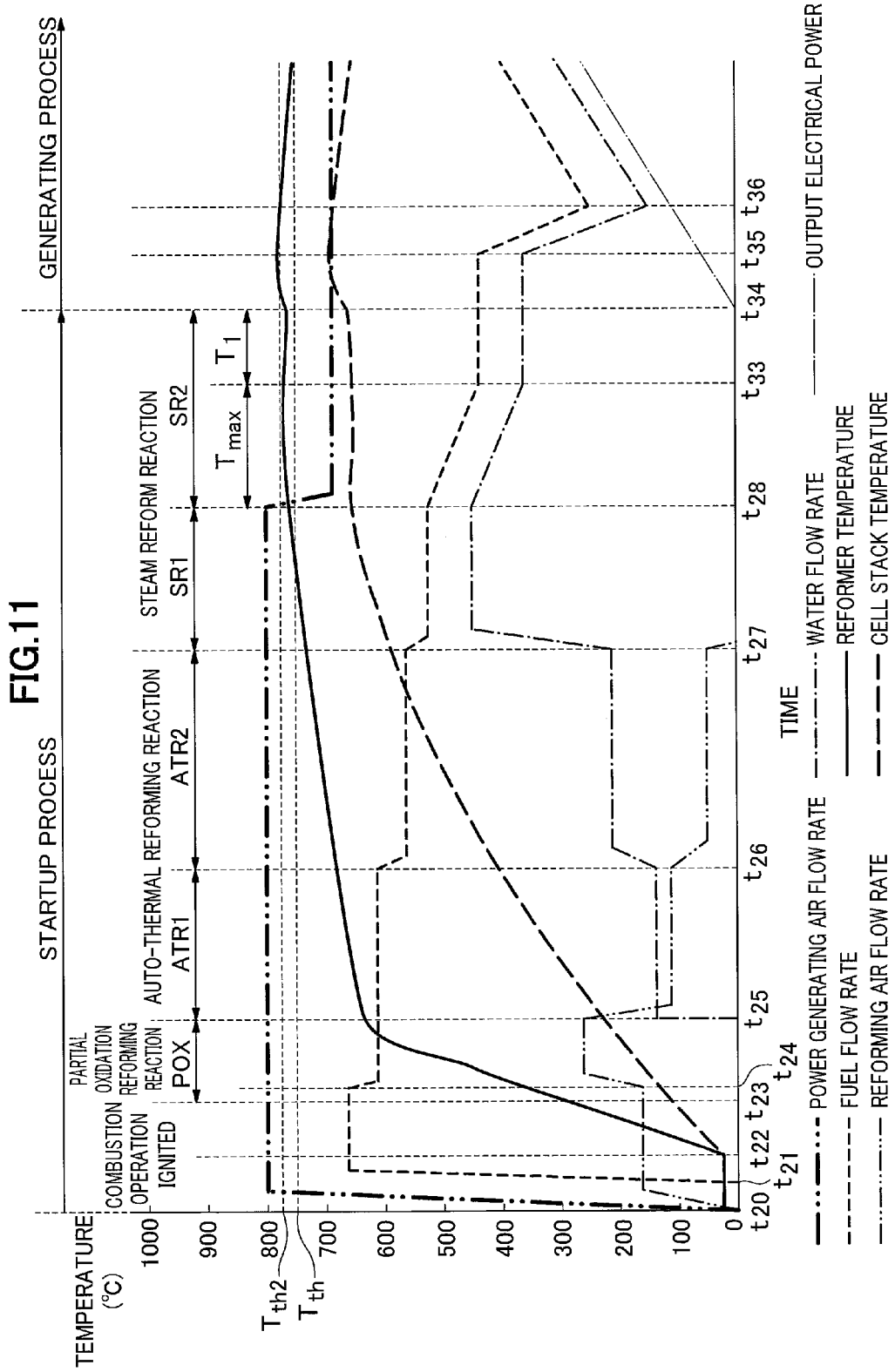
FIG. 11: An explanatory diagram of an excess temperature rise suppression control at time of startup of a fuel cell device according to an embodiment of the present invention.

Next, referring to FIG. 11, we discuss the processing performed when the reformer temperature does not drop down to the threshold temperature $T_{th}$ within the maximum temperature reduction period $T_{max}$ under the excess temperature rise suppression control shown in FIG. 10.

In FIG. 11, time $t_{20}$ to time $t_{28}$ is essentially the same as FIG. 10, so an explanation thereof is omitted.

When the SR1 process ends, the reformer temperature exceeds the threshold temperature $T_{th}$ (in this example 750° C.), so the control unit 110 determines the presence of a temperature rise assist state, and in the SR2 process reduces the fuel gas supply amount and water supply amount at a predetermined rate of reduction (times $t_{28}$ to $t_{33}$).

However, if the reformer temperature has not dropped to the threshold temperature $T_{th}$ or below at the time when the maximum temperature reduction period $T_{max}$ has elapsed (time $t_{33}$) starting from the time $t_{28}$ when the reduction started, the control unit 110 stops the reduction in the fuel gas supply amount and water supply amount at the point when the maximum temperature reduction period $T_{max}$ elapses, holding the supply amounts at this time. That is, the reformer temperature does not fall below the threshold temperature $T_{th}$ even when the supply amounts are respectively reduced by a sufficient reduction amount (maximum reduction amount) corresponding to the maximum temperature reduction period $T_{max}$, so the control unit 110 stops the reduction in supply amounts.

Note that this example is one in which the maximum temperature reduction period $T_{max}$ elapses without the reformer temperature reaching the second threshold temperature $T_{th2}$ or the third threshold temperature $T_{th3}$.

The control unit 110 then waits until the generation transition period $T_1$ has elapsed from the point at which supply amounts were held fixed (time $t_{33}$) and the temperature distribution has stabilized, then causes a transition from the SR2 process to the generating process on the condition that the reformer temperature and cell stack temperature satisfy the respective transition temperature conditions (generating process transition conditions) of 650° C. or above for the reformer temperature and 700° C. or above for the cell stack temperature at the point (time $t_{34}$) when generation transition period $T_1$ has elapsed.

Note that in the present embodiment the generation transition period $T_1$ is set to a fixed value, and does not change in response to the extent of the temperature rise assist state, i.e. in response to the size of the rise in the reformer temperature relative to the threshold temperature $T_{th}$ at the end of the SR1 process. That is, skews in the temperature distribution such as localized high temperature spots in the fuel cell module 2 cannot be directly measured, and are also difficult to estimate.

Therefore in all conditions the generation transition period $T_1$ is fixed to permit transition to the generation process after the temperature distribution has settled and stabilized to a steady state.

As described above, when transitioning to the generating process, the cell stack temperature and reformer temperature temporarily rise due to the generating reaction in fuel cell stack 14, but such temporary temperature rises do not cause the reformer temperature to reach the anomaly determination temperature, due to the fact that the fuel gas supply amount is sufficiently reduced at the point of transition to generation, and that reformer temperature has not reached the second threshold temperature $T_{th2}$ during the elapse of the maximum temperature reduction period $T_{max}$, and there is a temperature margin from the threshold temperature $T_{th}$ to the anomaly determination temperature.

When transitioning to the generating process, the cell stack temperature rises gradually due to inflowing gas from the reformer 20 so as to catch up with the reformer temperature, and rises due to the generating reaction and Joule heat in the fuel cell stack 14. The cell stack temperature can thus be maintained at the electrical generation operating temperature. Meanwhile, when a generating process transition occurs, the fuel gas supply amount and water supply amount are sufficiently reduced below normal levels, and subsequently the fuel gas supply amount is further reduced (time $t_{35}$ forward), so that temperature rises are suppressed after the temporary temperature rise immediately following the generating process transition, and the reformer temperature is maintained in an appropriate temperature range.

Thus in the present embodiment when the reformer temperature does not decline to the threshold temperature $T_{th}$ or below even after the elapse of the temperature reduction period $T_2$, the temperature distribution is made appropriate by transitioning early to the generating process.

Figure 12:
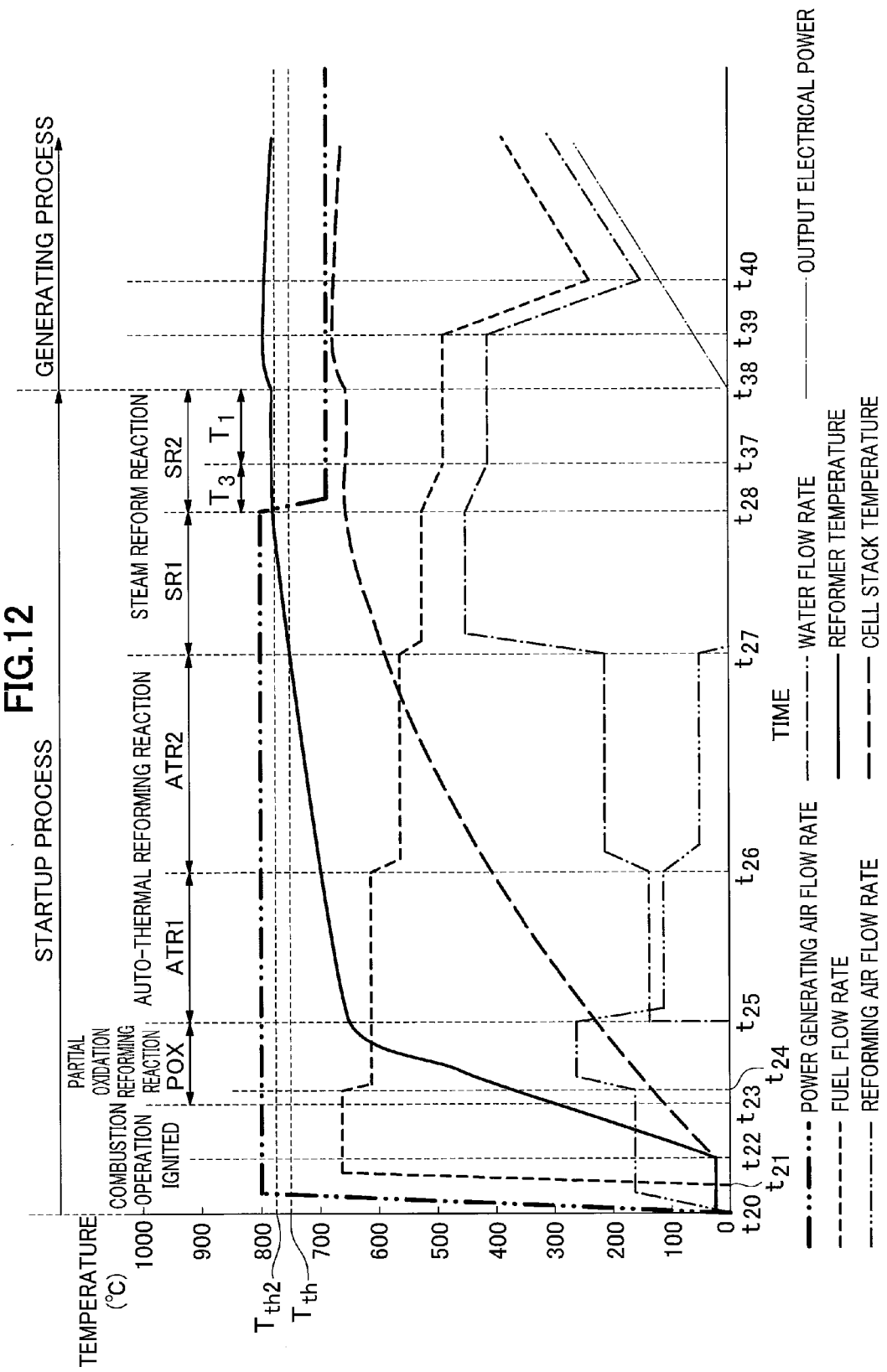
FIG. 12: An explanatory diagram of an excess temperature rise suppression control at time of startup of a fuel cell device according to an embodiment of the present invention.

Next, referring to FIG. 12, we discuss the processing carried out when the reformer temperature in the SR1 process is at or above the second threshold temperature $T_{th2}$, which is higher by a predetermined temperature than the threshold temperature $T_{th}$, under the excess temperature rise suppression control shown in FIG. 10.

In FIG. 11, from time $t_{20}$ to time $t_{28}$ is essentially the same for FIG. 10 and FIG. 11, so an explanation thereof is omitted. However at time $t_{28}$, the reformer temperature reaches the second threshold temperature $T_{th2}$ (in this case 780° C.) set even further above the threshold temperature $T_{th}$.

At the end of the SR1 process, the reformer temperature exceeds the threshold temperature $T_{th}$, so the control unit 110 determines the presence of a temperature rise assist state, and in the SR2 process reduces the fuel gas supply amount and water supply amount at a predetermined rate of reduction (times $t_{28}$ to $t_{37}$).

However, the reformer temperature at the end of the SR1 process is at or above the second threshold temperature $T_{th2}$, therefore the control unit 110 shortens the temperature reduction period $T_2$ or the maximum temperature reduction period $T_{max}$ in response to the reformer temperature at the end of the SR1 process. In FIG. 12, the temperature reduction period $T_2$ or the maximum temperature reduction period $T_{max}$ are changed to a shortened period $T_3$.

Therefore during the shortened temperature reduction period $T_3$ (time $t_{28}$ through $t_{37}$), the fuel gas supply amount and water supply amount is reduced at a fixed rate of reduction, and after these supply amounts have been reduced to the supply amounts at normal startup or below, the reduction of fuel gas supply amount and water supply amount is stopped at time $t_{37}$, and the supply amounts at this time are held.

The control unit 110 then waits until the generation transition period $T_1$ has elapsed from the point at which supply amounts were held fixed (time $t_{37}$) and the temperature distribution has stabilized, then causes a transition from the SR2 process to the generating process on the condition that the reformer temperature and cell stack temperature satisfy the respective transition temperature conditions (generating process transition conditions) of 650° C. or above for the reformer temperature and 700° C. or above for the cell stack temperature at the point (time $t_{38}$) when the generation transition period $T_1$ has elapsed.

If, as an example shown in the FIG. 12, the residual heat amount is large, and the reformer temperature has reached the second threshold temperature $T_{th2}$ or above at the point where the SR1 process ends, then the reformer temperature will not decline with time even if the fuel gas supply amount and water supply amount are reduced in the SR2 process; conversely it may rise. Therefore in the present embodiment when the residual heat amount is large, as in this case, an appropriate temperature distribution state is achieved by transitioning early to the generating process. By transitioning to the generating process, the cell stack temperature and reformer temperature do temporarily rise due to the generating reaction in fuel cell stack 14, but because the output power is set low from the beginning, the fuel gas supply amount and water supply amount are also set to a low value to match this (time $t_{39}$ forward). Thus the reformer temperature begins to drop before reaching the anomaly determination temperature, and an appropriate temperature range is maintained during the generating process.

When there is a transition to the generating process, the cell stack temperature rises gradually due to the inflowing gas from reformer 20 to catch up with the reformer temperature, and rises due to the generating reaction and Joule heat in the fuel cell stack 14. The cell stack temperature can thus be maintained at the electrical generation operating temperature.

Thus in the present embodiment, with a large residual heat amount such that the reformer temperature at the end of the SR1 process reaches the second threshold temperature $T_{th}$, the temperature reduction period $T_2$ or maximum temperature reduction period $T_{max}$ for reducing the fuel gas supply amount are shortened, and an early transition to the generating process is made after the elapse of the shortened temperature reduction period $T_3$ and generating transition period $T_1$. Using this constitution, in the present embodiment the temperature distribution can be stabilized in the reduced fuel gas supply amount generating process without causing the reformer temperature or cell stack temperature to reach the anomaly determination temperature.

Figure 13:
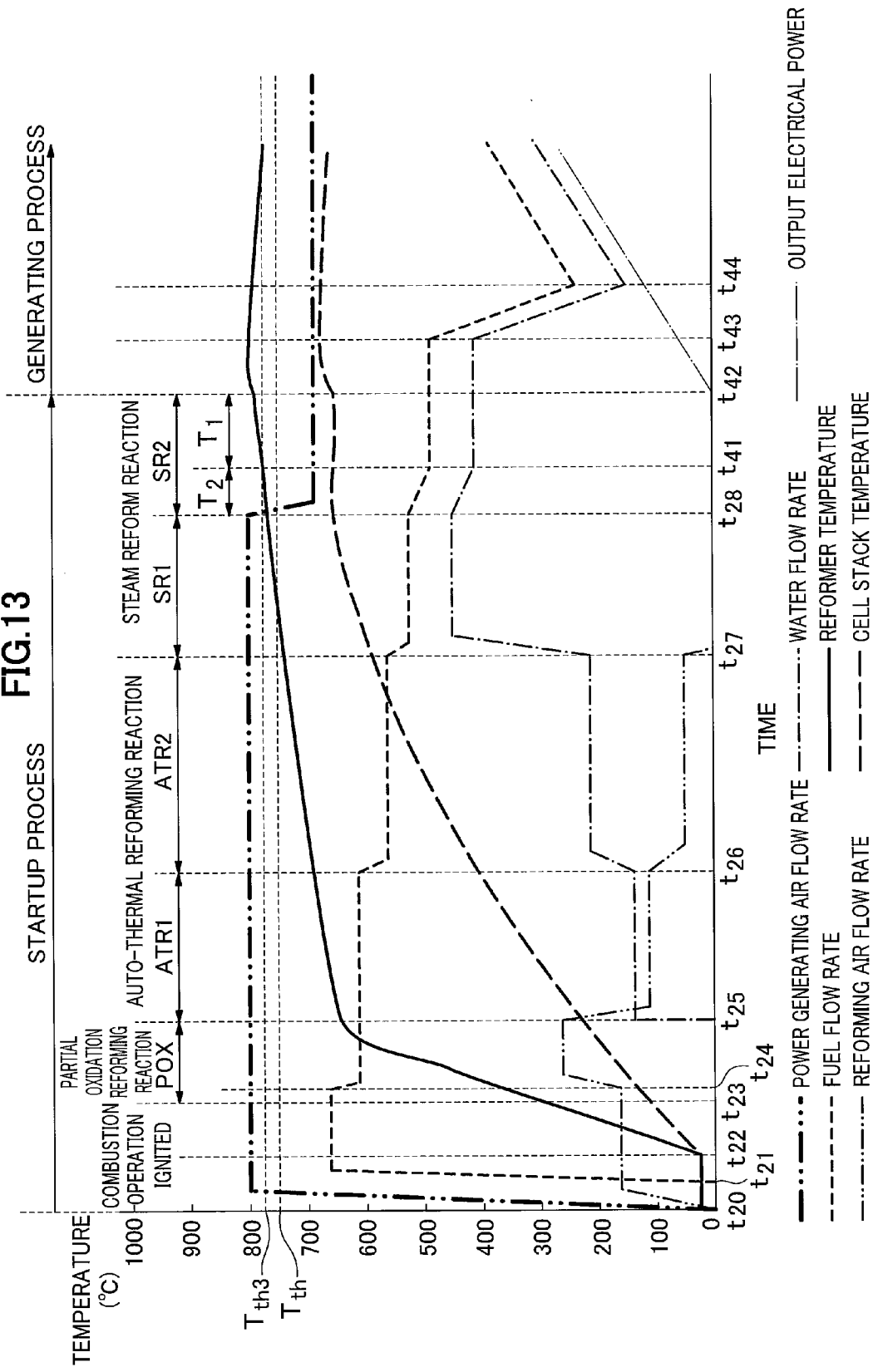
FIG. 13: An explanatory diagram of an excess temperature rise suppression control at time of startup of a fuel cell device according to an embodiment of the present invention.

Next, referring to FIG. 13, we discuss the processing performed when, during the temperature reduction period $T_2$, the reformer temperature reaches a third threshold temperature $T_{th3}$, higher by a predetermined temperature than threshold temperature $T_{th}$ under the excess temperature rise suppression control shown in FIG. 10.

In FIG. 13, time $t_{20}$ to time $t_{28}$ is essentially the same for FIG. 10 and FIG. 11, so an explanation thereof is omitted.

At the end of the SR1 process, the reformer temperature exceeds the threshold temperature $T_{th}$, so the control unit 110 determines that a temperature rise assist state is present, and in the SR2 process reduces the fuel gas supply amount and water supply amount at a predetermined rate of reduction (times $t_{28}$ to $t_{41}$).

However, notwithstanding that the fuel gas supply amount and water supply amount are reduced, the reformer temperature rises further during the temperature reduction period $T_3$, and at time $t_{41}$ reaches the third threshold temperature $T_{th3}$ (in this example, 780° C.). When the reformer temperature reaches third threshold temperature $T_{th3}$, the control unit 110 ends the temperature reduction period $T_2$ and stops the reduction in the fuel gas supply amount and water supply amount, holding the supply amount as of this time.

Note that third threshold temperature $T_{th3}$ is a temperature setting value between the threshold temperature $T_{th}$ and the anomaly determination temperature, and may be the same temperature as the second threshold temperature $T_{th2}$, or may be a higher or lower temperature than the second threshold temperature $T_{th2}$.

The control unit 110 then waits until the generation transition period $T_1$ has elapsed from the point at which supply amounts were held fixed (time $t_{41}$) and the temperature distribution has stabilized, then causes a transition from the SR2 process to the generating process on the condition that the reformer temperature and cell stack temperature satisfy the respective transition temperature conditions (generating process transition conditions) of 650° C. or above for the reformer temperature and 700° C. or above for the cell stack temperature at the point (time $t_{42}$) when the generation transition period $T_1$ has elapsed.

When, as an example shown in the FIG. 13, the amount of residual heat is large and the reformer temperature reaches the third threshold temperature $T_{th3}$ notwithstanding that the fuel gas supply amount and water supply amount have been reduced in the SR2 process, it is difficult to reduce the reformer temperature to an appropriate value by reducing supply amounts in the SR2 process. Therefore in the present embodiment when the residual heat amount is large as in this case, an appropriate temperature distribution state is achieved by transitioning early to the generating process, as in the FIG. 12 example. Using this constitution, in the present embodiment the temperature distribution can be stabilized in the reduced fuel gas supply amount generating process without causing the reformer temperature or cell stack temperature to reach the anomaly determination temperature.

The invention claimed is:

1. A solid oxide fuel cell system, comprising:
   a cell stack including an array of multiple fuel cell units;
   a reformer configured to reform fuel gas and supply the reformed fuel gas to the fuel cell units;
   a combustion portion configured to burn an unused surplus of the reformed fuel gas having passed through the fuel cell units and produce high temperature exhaust gas which is used to heat the reformer and the cell stack;
   a temperature detector configured to detect a temperature of the cell stack and a temperature of the reformer;
   a module housing chamber shaped to house the cell stack and the reformer;
   a heat storage disposed around the module housing chamber; and
   a controller programmed to thermally prepare the fuel cell system for generation of electricity through sequentially performed startup operations comprising a steam reforming (SR) reaction operation,
   wherein the controller is programmed to supply fuel gas, oxidant gas, and steam at controlled supply rates to the reformer during the startup operations and advance the startup operations in sequence from one operation to a next operation upon a determination by the controller that the detected cell stack temperature and the detected reformer temperature exceed a set of cell stack transition temperature and reformer transition temperature, respectively, which are predetermined to advance the startup operations from the one operation to the next operation, and wherein the controller is further programmed to:
(a) at a transition from the one startup operation to the next startup operation, determine whether the detected reformer temperature exceeds a first threshold temperature of multiple predetermined threshold temperatures, wherein the first threshold temperature is higher than the reformer transition temperature;
(b) upon a determination by the controller that the detected reformer temperature exceeds the first threshold temperature, start an overheat preventive operation at a beginning of the next startup operation, wherein during the overheat preventive operation, the controller is programmed to supply the fuel gas to the reformer at a fuel supply rate decreasing over time; and
(c) end the overheat preventive operation at an end time at which the controller is programmed to stop the fuel supply rate from decreasing, wherein the end time is determined adaptively to the detected reformer temperature.

2. The solid oxide fuel cell system of claim 1, wherein by supplying the fuel gas at the decreasing fuel supply rate during the overheat preventive operation, the controller is programmed to supply the fuel gas to the reformer at a transition to generation of electricity at a fuel supply rate lower than one which would be effected if the controller did not perform the overheat preventive operation.

3. The solid oxide fuel cell system of claim 2, wherein the controller is programmed to perform the overheat preventive operation during the SR operation.

4. The solid oxide fuel cell system of claim 3, wherein during the SR operation, at the end time of the overheat preventive operation, a constant supply operation starts in which the controller is programmed to means hold, for a reminder of the next startup operation, the fuel supply rate constant at a level of the fuel supply rate effected at the end time of the overheat preventive operation.

5. The solid oxide fuel cell system of claim 4, wherein the controller is programmed to end the overheat preventive operation at the end time, at which time the detected reformer temperature falls to the predetermined first threshold temperature or below.

6. The solid oxide fuel cell system of claim 5, wherein before the detected reformer temperature falls to the first threshold temperature or below, the controller is programmed to end the overheat preventive operation at the end time, at which time a fixed maximum end time allowed for the overheat preventive operation to run elapses.

7. The solid oxide fuel cell system of claim 6, wherein the multiple predetermined threshold temperatures include a second threshold temperature higher than the first threshold temperature, and upon a determination by the controller at the transition from the one startup operation to the next startup operation that the detected reformer temperature is at or above the second threshold temperature, the controller is programmed to end the overheat preventive operation at the end time, at which time another fixed end time elapses which is set shorter than the fixed maximum end time.

8. The solid oxide fuel cell system of claim 6, wherein the controller is programmed to perform the constant supply operation for the reminder of the next startup operation, which is fixed in time length irrespective of the detected reformer or cell stack temperature.

9. The solid oxide fuel cell system of claim 5, wherein the multiple predetermined threshold temperatures include a third threshold temperature higher than the first threshold temperature, and the controller is programmed to end the overheat preventive operation at the end time, at which time the detected reformer temperature exceeds the third threshold temperature.

10. The solid oxide fuel cell system of claim 9, wherein the controller is programmed to perform the constant supply operation for the reminder of the next startup operation, which is fixed in time length irrespective of the detected reformer or cell stack temperature.

11. A solid oxide fuel cell system, comprising:
a cell stack including an array of multiple fuel cell units;
a reformer configured to reform fuel gas and supply the reformed fuel gas to the fuel cell units;
a combustion portion configured to burn an unused surplus of the reformed fuel gas having passed through the fuel cell units and produce high temperature exhaust gas which is used to heat the reformer and the cell stack;
a temperature detector configured to detect a temperature of the cell stack and a temperature of the reformer;
a module housing chamber shaped to house the cell stack and the reformer;
a heat storage disposed around the module housing chamber;
a controller programmed to thermally prepare the fuel cell system for generation of electricity through sequentially performed startup operations comprising a steam reforming (SR) reaction operation,
wherein the controller is programed to supply fuel gas, oxidant gas, and steam at controlled supply rates to the reformer during the startup operations and advance the startup operations in sequence from one operation to a next operation upon each determination by the controller that the detected cell stack temperature and the detected reformer temperature satisfy a set of cell stack transition temperature and reformer transition temperature, respectively, which are predetermined to advance the startup operations from the one operation to the next operation, and
wherein the controller is further programmed to determine, at a transition from the one startup operation to the next startup operation, whether the detected reformer temperature exceeds a first threshold temperature of multiple predetermined threshold temperatures, wherein the first threshold temperature is higher than the reformer transition temperature; and
means for supplying, if the controller determines that the detected reformer temperature exceeds the first threshold temperature, the fuel gas to the reformer at a transition to generation of electricity from the startup operations at a fuel supply rate lower than one which would be effected if the controller determined otherwise.

12. The solid oxide fuel cell system of claim 11, wherein the means for supplying the fuel gas to the reformer comprises the controller programmed to:
(a) upon a determination by the controller that the detected reformer temperature exceeds the first threshold temperature, start an overheat preventive operation at a beginning of the next startup operation, wherein during the overheat preventive operation, the controller is programmed to supply the fuel gas to the reformer at a fuel supply rate decreasing over time;
(b) end the overheat preventive operation at an end time at which time the detected reformer temperature falls to the predetermined first threshold temperature or below; and
(c) immediately subsequent to the end time of the overheat preventive operation, perform, for a reminder of the next startup operation, a constant supply operation in which the controller is programmed to hold the fuel supply rate constant at a level of the fuel supply rate effected at the end time of the overheat preventive operation, wherein the reminder of the next startup operation is fixed in time length irrespective of the detected reformer or cell stack temperature.

13. The solid oxide fuel cell system of claim 11, wherein the means for supplying the fuel gas to the reformer comprises the controller programmed to:
  (a) upon a determination by the controller that the detected reformer temperature exceeds the first threshold temperature, start an overheat preventive operation at a beginning of the next startup operation, wherein during the overheat preventive operation, the controller is programmed to supply the fuel gas to the reformer at a fuel supply rate decreasing over time;
  (b) before the detected reformer temperature falls to the first threshold temperature or below, end the overheat preventive operation at an end time at which a fixed maximum end time allowed for the overheat preventive operation to run elapses; and
  (c) immediately subsequent to the end time of the overheat preventive operation, perform, for a reminder of the next startup operation, a constant supply operation in which the controller is programmed to hold the fuel supply rate constant at a level of the fuel supply rate effected at the end time of the overheat preventive operation, wherein the reminder of the next startup operation is fixed in time length irrespective of the detected reformer or cell stack temperature.

14. The solid oxide fuel cell system of claim 11, wherein the means for supplying the fuel gas to the reformer comprises the controller programmed to:
  (a) upon a determination by the controller that the detected reformer temperature exceeds the first threshold temperature, start an overheat preventive operation at a beginning of the next startup operation, wherein during the overheat preventive operation, the controller is programmed to supply the fuel gas to the reformer at a fuel supply rate decreasing over time;
  (b) upon a determination by the controller at a transition from the one startup operation to the next startup operation that the detected reformer temperature is at or above a second threshold temperature higher than the first threshold temperature, end the overheat preventive operation at an end time at which a fixed end time elapses which is set shorter than a maximum end time allowed for the overheat preventive operation to run; and
  (c) immediately subsequent to the end time of the overheat preventive operation, perform, for a reminder of the next startup operation, a constant supply operation in which the controller is programmed to hold the fuel supply rate constant at a level of the fuel supply rate effected at the end time of the overheat preventive operation, wherein the reminder of the next startup operation is fixed in time length irrespective of the detected reformer and cell stack temperature.

15. The solid oxide fuel cell system of claim 11, wherein the means for supplying the fuel gas to the reformer comprises the controller programmed to:
  (a) upon a determination by the controller that the detected reformer temperature exceeds the first threshold temperature, start an overheat preventive operation at a beginning of the next startup operation, wherein during the overheat preventive operation, the controller is programmed to supply the fuel gas to the reformer at a fuel supply rate decreasing over time;
  (b) end the overheat preventive operation at an end time at which the detected reformer temperature exceeds a third threshold temperature higher than the first threshold temperature; and
  (c) immediately subsequent to the end time of the overheat preventive operation, perform, for the reminder of the next startup operation, a constant supply operation in which the controller is programmed to hold the fuel supply rate constant at a level of the fuel supply rate effected at the end time of the overheat preventive operation, wherein the reminder of the next startup operation is fixed in time length irrespective of the detected reformer or cell stack temperature.

16. The solid oxide fuel cell system of claim 11, wherein the controller is programmed to perform the overheat preventive operation during the SR operation.

* * * * *